(12) United States Patent
Croxford et al.

(10) Patent No.: US 10,510,323 B2
(45) Date of Patent: *Dec. 17, 2019

(54) DISPLAY CONTROLLER

(71) Applicant: ARM Limited, Cambridge (GB)

(72) Inventors: Daren Croxford, Cambridge (GB); Damian Piotr Modrzyk, Cambridge (GB); Piotr Tadeusz Chrobak, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,058

(22) Filed: Nov. 9, 2016

(65) Prior Publication Data

US 2017/0140500 A1 May 18, 2017

(30) Foreign Application Priority Data

Nov. 13, 2015 (GB) .................................. 1520070.2
Mar. 30, 2016 (GB) .................................. 1605322.5

(51) Int. Cl.
*G06T 1/20* (2006.01)
*G09G 5/36* (2006.01)
(Continued)

(52) U.S. Cl.
CPC ............ *G09G 5/363* (2013.01); *G06F 3/1423* (2013.01); *G06F 3/1431* (2013.01); *G06T 1/20* (2013.01);
(Continued)

(58) Field of Classification Search
None
See application file for complete search history.

(56) References Cited

U.S. PATENT DOCUMENTS

| 6,347,344 B1* | 2/2002 | Baker ................... G06F 13/102 345/501 |
| 2010/0013840 A1* | 1/2010 | Hunkins ................... G06F 3/14 345/502 |

(Continued)

FOREIGN PATENT DOCUMENTS

GB 2524359 9/2015

OTHER PUBLICATIONS

Combined Search and Examination Report dated Sep. 9, 2016, GB Patent Application No. GB1605322.5.

*Primary Examiner* — Yanna Wu
(74) *Attorney, Agent, or Firm* — Vierra Magen Marcus LLP

(57) ABSTRACT

A display controller 10 comprises a first display processing core 20 comprising a first input stage operable to read at least one input surface, a first processing stage operable to generate an output surface, a first output stage operable to provide an output surface for display to a first display 3, and a first write-out stage 27 operable to write data of an output surface to external memory 1, and a second display processing core 40 comprising a second input stage operable to read at least one input surface, a second processing stage operable to generate an output surface, and a second output stage operable to provide an output surface for display to a second display 5. The display controller 10 also comprises an internal data path 30 for passing data of an output surface from the first display core 20 to the second display core 40.

22 Claims, 9 Drawing Sheets

(51) Int. Cl.
*G06F 3/14* (2006.01)
*G09G 5/14* (2006.01)
*G06T 1/60* (2006.01)
*G09G 5/393* (2006.01)
*G09G 5/395* (2006.01)
*G09G 5/377* (2006.01)

(52) U.S. Cl.
CPC ............... *G06T 1/60* (2013.01); *G09G 5/14* (2013.01); *G09G 5/377* (2013.01); *G09G 5/393* (2013.01); *G09G 5/395* (2013.01); *G06F 3/1454* (2013.01); *G09G 2340/04* (2013.01); *G09G 2340/12* (2013.01); *G09G 2350/00* (2013.01); *G09G 2360/02* (2013.01); *G09G 2360/04* (2013.01); *G09G 2360/06* (2013.01); *G09G 2360/08* (2013.01); *G09G 2360/18* (2013.01)

(56) References Cited

U.S. PATENT DOCUMENTS

| | | | | |
|---|---|---|---|---|
| 2010/0265261 A1* | 10/2010 | Chandler | ................ | G09G 5/36 345/547 |
| 2011/0320770 A1* | 12/2011 | Yamada | .............. | G06F 13/1663 712/37 |
| 2012/0268480 A1* | 10/2012 | Cooksey | ................ | G06T 1/60 345/619 |
| 2013/0033477 A1* | 2/2013 | Sirpal | ................... | G06F 1/1616 345/211 |
| 2014/0327684 A1* | 11/2014 | Engh-Halstvedt | ........ | G06T 1/20 345/506 |
| 2015/0269912 A1 | 9/2015 | Chen | | |

* cited by examiner

DISPLAY CONTROLLER

BACKGROUND

The technology described herein relates to display controllers for data processing systems.

In data processing systems, an image that is to be displayed to a user is processed by the data processing system for display. The image for display is typically processed by a number of processing stages before it is displayed to the user. For example, an image will be processed by a so called "display controller" of a display for display.

Typically, the display controller will read an output image to be displayed from a so called "frame buffer" in memory which stores the image as a data array (e.g. by internal Direct Memory Access (DMA)) and provide the image data appropriately to the display (e.g. via a pixel pipeline) (which display may, e.g., be a screen or printer). The output image is stored in the frame buffer in memory, e.g. by a graphics processor, when it is ready for display and the display controller will then read the frame buffer and provide the output image to the display for display.

The display controller processes the image from the frame buffer to allow it to be displayed on the display. This processing includes appropriate display timing functionality (e.g. it is configured to send pixel data to the display with appropriate horizontal and vertical blanking periods), to allow the image to be displayed on the display correctly.

Many electronic devices and systems use and display plural windows (or surfaces) displaying information on their display screen, such as video, a graphical user interface, etc. One way of providing such windows is to use a compositing window system, in which individual input windows (surfaces) are combined appropriately (i.e. composited) and the result is written out to the frame buffer, which is then read by the display controller for display.

It is also possible to combine the functions of the compositing system into a display controller, e.g. to provide a compositing display controller. In this case, individual input windows (surfaces) are read and combined appropriately (i.e. composited) by the display controller, and then a combined (composited) surface is provided for display by the display controller. This can reduce the number of read and write operations to external memory and thereby the power and memory bandwidth of the overall data processing system.

It is becoming increasingly common for electronic devices and systems to be configured so as to be able to provide output images for display on plural display devices. It may be desired, for example, to provide output images to the system's local display (such as a display panel) and to an external display. The output images provided to the two displays may be the same, or may differ, for example the external display may require and use a different resolution and/or aspect ratio to the local display.

FIG. 1 shows schematically the operation of a conventional dual-display compositing media processing system in a so called "clone" mode of operation, wherein corresponding content is displayed on both a primary (e.g. local) and secondary (e.g. external) display. Plural input surfaces or layers (e.g. 1-4) are generated, and stored in main memory 1. The stored input surfaces are each read by the primary display processor 2, combined (composited) to generate a composited output surface (frame), and then displayed on the primary display 3. Similarly, the stored input surfaces are each read by a secondary display processor 4, combined (composited) to generate a composited output surface (frame), and then displayed on the secondary display 5.

The main memory 1 of the system is typically external to the display controller(s). The reading of data from and writing data to the main memory 1 (e.g. frame buffer) can therefore consume a relatively significant amount of power and memory bandwidth.

The Applicants' earlier application GB-A-2524359 describes a technique that can be used to reduce the number of read and write operations required for the so-called "clone" mode (and thereby the power and memory bandwidth) by providing a display controller with a write out stage operable to write an output surface to external memory. FIG. 2 shows schematically the operation of the display controller of GB-A-2524359.

As shown in FIG. 2, plural input surfaces or layers (e.g. Layers 1-4) are again generated, and stored in main memory 1. The stored input surfaces are each read by the primary display processor 2, combined (composited) to generate a composited output surface (frame), and then displayed on the primary display 3. However, rather than the secondary display processor 4 also reading each of the stored input surfaces for composition, the combined (composited) surface generated by the primary display processor 2 is instead written to main memory 1. The secondary display processor 4 then reads the composited surface from main memory 1, optionally processes (e.g. scales or rotates) the surface for display, and then provides the surface for display on the secondary (e.g. external) display 5.

Accordingly, only one write operation to the main memory 1 and one read operation from the main memory 1 is required for the dual-display operation in "clone" mode (i.e. after the plural input surfaces have been read). Accordingly, the memory bandwidth and power consumption is reduced compared with the conventional arrangements.

Notwithstanding this, the Applicants believe that there remains scope for improvements to display controllers.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
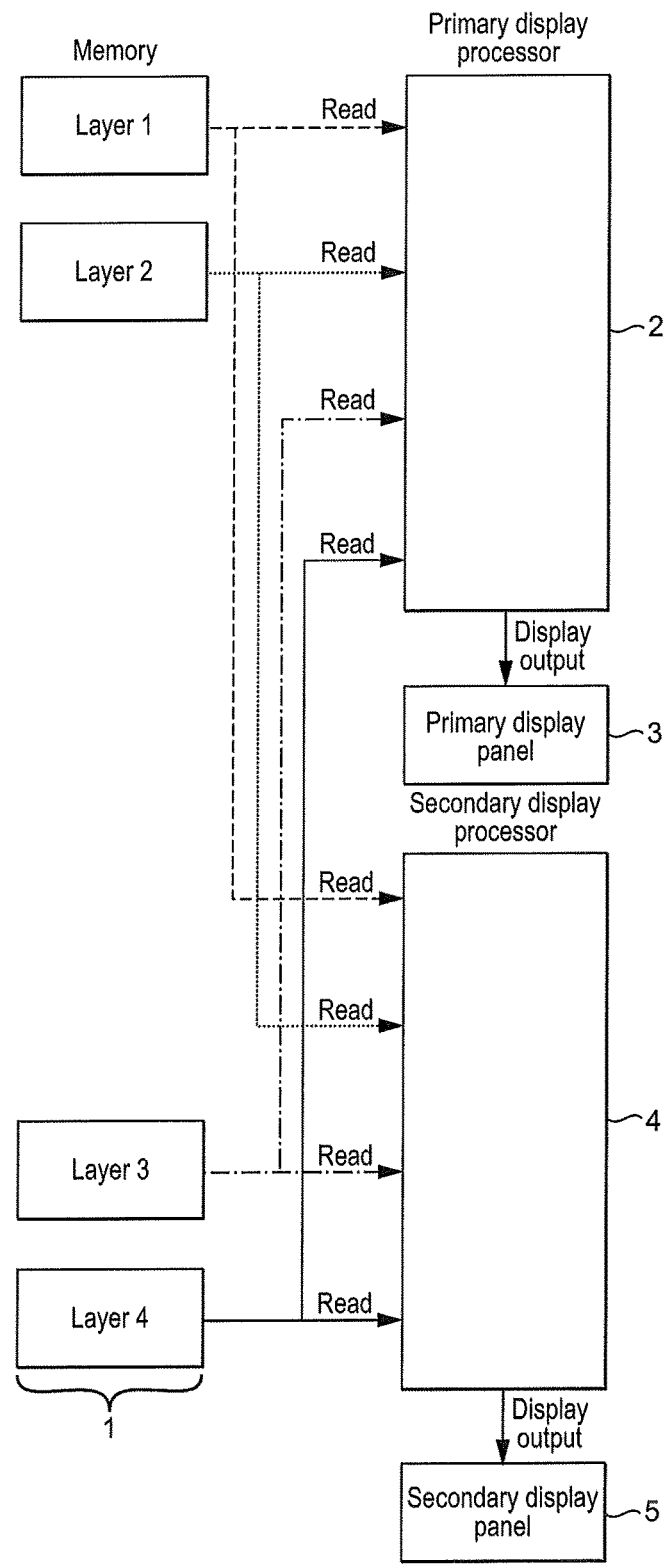
FIG. 1 shows schematically a dual-display composition process.
Figure 2:
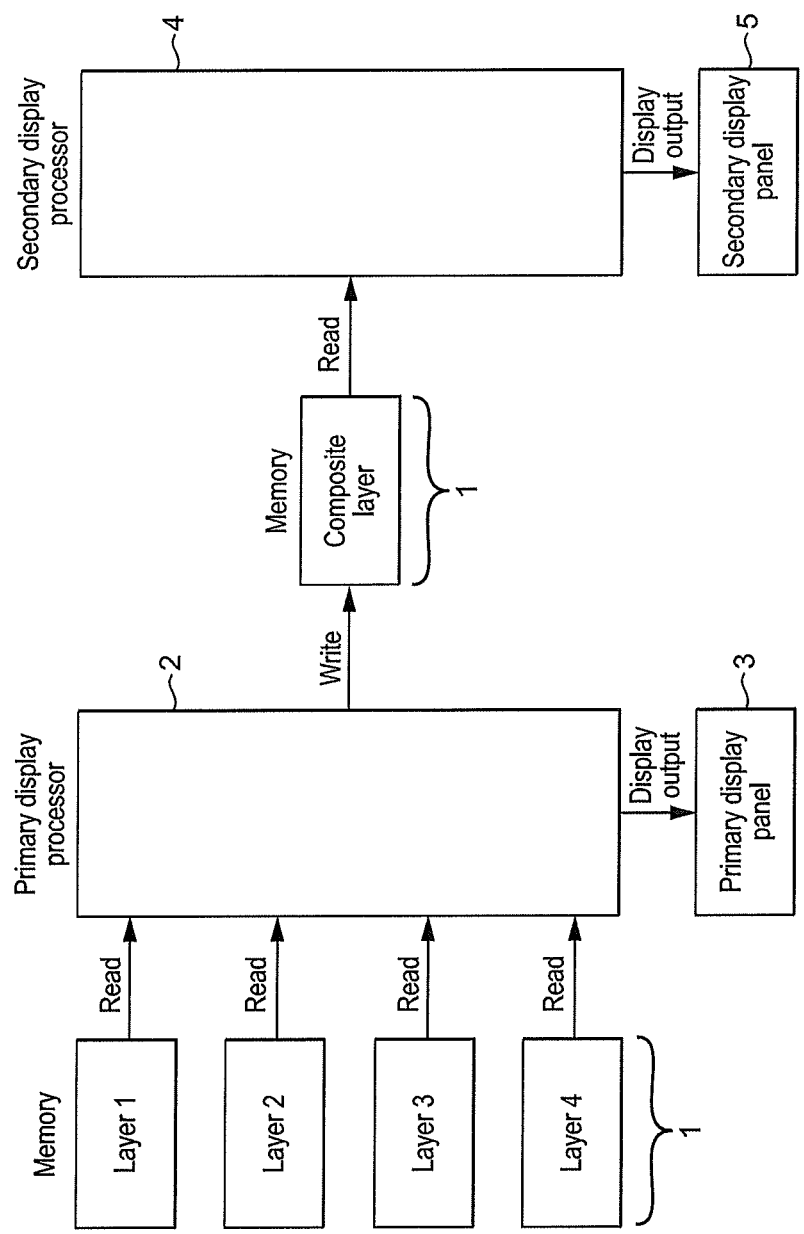
FIG. 2 shows schematically another dual-display composition process.

A first embodiment of the technology described herein comprises a display controller for a data processing system, the display controller comprising:

a first display processing core comprising a first input stage operable to read at least one input surface, a first processing stage operable to process one or more input surfaces to generate an output surface, a first output stage operable to provide an output surface for display to a first display, and a first write-out stage operable to write data of an output surface to external memory;

a second display processing core comprising a second input stage operable to read at least one input surface, a second processing stage operable to process one or more input surfaces to generate an output surface, and a second output stage operable to provide an output surface for display to a second display; and an internal data path for passing data of an output surface from the first display core to the second display core.

A second embodiment of the technology described herein comprises a method of operating a display controller in a data processing system, the display controller comprising a first display processing core, a second display processing core and an internal data path for passing data of an output surface from the first display core to the second display core, the method comprising:

the first display core reading at least one input surface, processing one or more input surfaces to generate an output surface, and providing an output surface for display to a first display;

the first display core writing data of the output surface to external memory and/or passing data of the output surface to the second display core via the internal data path; and the second display core receiving the output surface, processing one or more surfaces to generate an output surface, and providing an output surface for display to a second display.

The technology described herein relates to a display controller comprising at least a first display core and a second display core. Each display core of the display controller includes an input stage and an output stage that can be used to read in at least one input surface (layer) and provide an output surface (frame) for display to a display. Thus, the display controller of the technology described herein can be (and in an embodiment is) used to provide output surfaces for display to plural (e.g. two) displays.

Each display processing core of the display controller of the technology described herein further comprises a processing stage operable to process an input surface or surfaces to provide an output surface. Thus, the display controller of the technology described herein can be (and in an embodiment is) used to provide processed (e.g. composited) output surfaces for display to plural displays.

At least the first processing core of the display controller of the technology described herein further comprises a write-out stage operable to write data of an output surface to external memory. The write-out stage means that the first processing core can be operated to write out data of an output surface to external memory (such as a frame buffer), e.g. at the same time as an output surface is displayed on the first display. This can facilitate a greater degree of control and flexibility in the types of operation that can be carried out by the display controller, and can be used to reduce bandwidth consumption of the overall data processing system, e.g. by reducing the number of reads and/or writes to external memory.

For example, when operating in a "clone" mode, wherein the same or a similar output surface is displayed on plural displays, the first display core can be (and in an embodiment is) used to read and process (e.g. combine) plural surfaces (layers) to generate an (e.g. composited) output surface (frame) for display, to then provide the output surface for display to the first display, and to also write data of the output surface to external memory. The second display core may then read the output surface data from external memory, and provide an output surface for display to the second display. Accordingly, the number of read and write operations to external memory can be reduced for the clone mode.

Moreover, the display controller of the technology described herein further comprises an internal data path for passing data of an output surface from the first display core to the second display core. As will be described in more detail below, this can facilitate an even greater degree of control and flexibility in the types of operation that can be carried out by the display controller, and can be used to further reduce bandwidth consumption of the overall data processing system, e.g. by further reducing the number of reads and/or writes to external memory.

For example, when operating in the clone mode described above, the first display processing core can be (and in an embodiment is) operated to provide data of the generated (e.g. composited) output surface (frame) to the second display processing core via the internal data path (rather than writing that data to external memory). Accordingly, in this case, the number of read and write operations to external memory can be further reduced, and correspondingly the memory bandwidth and power consumption of the overall data processing system can be further reduced.

Furthermore, the display controller of the technology described herein can be (and in an embodiment is) operated to provide an output surface generated by the first processing core to the second display core either by the first display core writing data of the output surface to external memory and the second display core then reading the data from memory, and/or the first display core passing data of the output surface to the second display core via the internal data path. That is, data of an output surface can be (and in an embodiment is) selectively passed to the second display core via one of two routes.

In particular, and as will be discussed in more detail below, the Applicants have recognised that when operating in the clone mode, if data of the output surface generated by the first display core can be passed to the second display core via the internal data path, that will then avoid the need for any external memory reads and writes for displaying the cloned output surface via the second display core. However, the Applicants have further recognised that the data of the output surface currently being generated by the first display core may not be appropriate to be transferred to the second display core at the time that it is generated. In that case, the first display core can still write that output surface data to external memory such that the second display core can then read that data from external memory when it is needed.

The technology described herein can accordingly allow data to be more efficiently transferred between the two display cores via the internal data path when operating in clone mode, whilst still providing a "fallback" operation of being able to write the data to and read the data from the external memory where the internal data path may not be appropriate.

It will be appreciated, therefore, that the technology described herein provides an improved display controller.

The first and second display cores of the display controller may comprise any suitable such display processing cores (display processing units). The first and second display processing cores are in an embodiment provided as or on the same chip (monolithic integrated circuit), i.e. are integrated. The first and second display cores may be different, but are in an embodiment substantially identical.

The first display core is in an embodiment a display core that operates with the same resolution as or with a higher resolution than the second display core (and correspondingly the first display is in an embodiment a display that operates with the same resolution as or with a higher resolution than the second display). This means that when operating in a clone mode (i.e. where the first display core is used to generate an (e.g. composited) output surface for display on both displays), then the output surface generated by the primary display core will have sufficient resolution for the higher resolution display.

However, it would also be possible for the first display core to be a display core that operates at a lower resolution than the second display core (and for the first display to be display that operates at a lower resolution than the second display).

The first display core is in an embodiment the "primary" display core, e.g. for controlling the data processing system's (the device's) local (integrated) display (e.g. screen or panel) and the second display core is in an embodiment the "secondary" display core, e.g. for controlling an external display. However, it would also be possible for the first display to be the secondary (external) display core and the second display core to be the primary (local) display core.

The display controller may also comprise one or more further display processing cores (and in an embodiment, this is the case). Any number of further display processing cores may be provided in addition to the first and second display cores, such as one, two, three, four, etc., further display processing cores. Each of the one or more further display processing cores may be configured in a corresponding manner to the first and/or second display cores.

Each input stage may comprise any suitable such stage operable to read at least one input surface. In an embodiment, one or each input stage comprises a read controller, such as for example a Direct Memory Access (DMA) read controller.

In an embodiment, at least one or each of the first and second input stages (read controllers) is configured to read at least one input surface from a memory in which the at least one input surface is stored. The memory may comprise any suitable memory and may be configured in any suitable and desired manner. For example, it may be a memory that is on chip with the display controller or it may be an external memory. In an embodiment it is an external memory, such as a main memory of the overall data processing system. It may be dedicated memory for this purpose or it may be part of a memory that is used for other data as well. In an embodiment at least one or each input surface is stored in (and read from) a frame buffer.

Each input surface read by a display core (input stage) may be any suitable and desired such surface. In an embodiment the at least one input surface that is read by a display core (input stage) is at least one input surface from which an output surface is to be generated (i.e. by the processing stage). In one embodiment, at least one or each input surface is an input window (to be displayed), and in an embodiment an image, e.g. frame, for display.

In an embodiment, one or more or each input surface comprises an array of data. The or each array of data in an embodiment comprises an array of plural data positions, with each data position taking a particular data (e.g. colour) value. In an embodiment, the data comprises image data, i.e. one or more arrays of image (colour) data, e.g. one or more frames, for display or otherwise.

In an embodiment, one or more or each input surface is provided as (takes the form of) (comprises) plural data words (e.g. such as plural Advance eXtensible Interface (AXI) words), where each word in an embodiment includes data in respect of multiple data positions of the data array.

Accordingly, in an embodiment, an input stage reading an input surface comprises the input stage reading plural data words of the input surface. Correspondingly, the input stage in an embodiment generates read transactions, e.g. in order to read each data word of the input surface.

In an embodiment one or each input stage comprises a buffer memory, i.e. local (internal) memory, operable to buffer (store) data (e.g. transactions and/or data words) of the one or more input surfaces read by the input stage.

In an embodiment, one or each input stage comprises a re-order stage, that is operable to re-order data (e.g. transactions and/or data words) of an input surface read by the input stage out of order, e.g. before onwardly transmitting the (re-ordered) input surface. The or each re-order stage may comprise, for example, a re-order buffer that is operable both to buffer (store) data of an input surface read by the input stage, and to re-order data of the input surface that is read by the input stage out of order.

The input surface or surfaces can be generated as desired. For example one or more input surfaces may be generated by being appropriately rendered and stored into a memory (e.g. frame buffer) by a graphics processing system (a graphics processor). Additionally or alternatively, one or more input surfaces may be generated by being appropriately decoded and stored into a memory (e.g. frame buffer) by a video codec. Additionally or alternatively, one or more input surfaces may be generated by a digital camera image signal processor (ISP), or other image processor. The input surface or surfaces may be, e.g., for a game, a demo, a graphical user interface (GUI), a GUI with video data (e.g. a video frame with graphics "play back" and "pause" icons), etc.

There may only be one input surface that is read by a (e.g. the first) display core (and processed to generate an output surface), but in an embodiment there are plural (two or more) input surfaces that are read by a (e.g. the first) display core (and processed to generate an output surface).

Correspondingly, each input surface that is processed by a display core (processing stage) may be any suitable and desired such surface. At least one and in an embodiment each of the input surfaces processed by the first display core (first processing stage) is in an embodiment an input surface read by the first display core (first input stage).

At least one or the or each surface processed by the second display core (second processing stage) is in an embodiment an (the) output surface generated by the first processing core (and either read by the second display core (second input stage) from memory or received by the second display core from the first display core via the internal data path). It would also be possible for one or more of the input surfaces processed by the second display core (second processing stage) to comprises an input surface read by the second display core (second input stage).

Each output surface generated by a display core (processing stage) may be any suitable and desired such surface. In an embodiment each output surface that is generated by a display core is at least one output window (to be displayed), and in an embodiment an image, e.g. frame, for display.

Each output surface that is generated by the second display core (processing stage) is in an embodiment a "final" output surface for display (on the second display), while each output surface generated by the first display core (processing stage) may be a "final" output surface for display (on the first and/or second display) and/or an "intermediate" output surface, e.g. to be passed to the second display core for further processing. As will be discussed further below, in embodiments, each output surface is composited from plural input surfaces (although this need not be the case).

In one embodiment, the first display core (processing stage) may generate a single output surface. In this embodiment, the single output surface generated by the first display core may be the output surface for display (i.e. the output surface for display displayed on the first display) and/or an output surface for which data is passed to the second display core. Alternatively, the first display core may generate plural, in an embodiment two, output surfaces (which may be the same or different). In this embodiment, one of the output surfaces may be an output surface for display (i.e. the output surface for display displayed on the first display) and another of the output surfaces may be an output surface for which data is passed to the second display core.

In one embodiment, the second display core (processing stage) may generate a single output surface. In this embodiment, the single output surface generated by the second display core may be an output surface for display (i.e. the output surface for display displayed on the second display). It would also be possible for the second processing stage to generate plural output surfaces.

Each processing stage may be operable to process at least one input surface to generate an output surface in any desired manner.

In one embodiment, at least one or each processing stage comprises a composition stage operable to compose (two or more) surfaces to generate a composited output surface. Each composition stage may be configured to compose surfaces to generate a composited output surface in any suitable manner as desired. In an embodiment, at least one or each composition stage is configured to blend the surfaces to generate a composited output surface.

The surfaces that are composed by the composition stage of the first display core may comprise one or more of the input surfaces read by the first display core (input stage) and/or one or more modified versions of the input surfaces read by the first display core (e.g. one or more decoded, decompressed, rotated, and/or scaled input surfaces, as will be discussed further below).

Where the second display core performs composition, then, the surfaces that are composed by the composition stage of the second display core in an embodiment includes the surface for which data is passed from the first display core to the second display core and/or a modified version of this surface. It would also be possible for the surfaces that are composed by the composition stage of the second display core to comprise one or more input surfaces read by the second display core (input stage) and/or one or more modified versions of input surface(s) read by the second display core (e.g. one or more decoded, decompressed, rotated, and/or scaled input surfaces).

Each composited output surface may be any suitable and desired such surface. In an embodiment at least one or each composited output surface that is generated by a composition stage is an output window (to be displayed), and in an embodiment an image, e.g. frame, for display.

At least one or each composited output surface may be a or the "final" output surface generated by the (first or second) display core (processing stage) in question, and/or at least one or each composited output surface may be subjected to further processing by the display core in question in order to generate a or the output surface (as will be discussed further below).

The input surfaces and the composited output surface(s) may have the same or different sizes, resolutions, etc.

In an embodiment, at least one or each processing stage also or instead, and in an embodiment also, comprises a decoding stage operable to decode (e.g. decompress) one or more surfaces, in an embodiment one or more of the input surfaces, e.g. to generate one or more decoded (e.g. decompressed) input surfaces. This is particularly useful in embodiments where one or more of the input surfaces is stored in an encoded (e.g. compressed) form. For example, one or more of the input surfaces may have been subjected to compression, such as for example, ARM Frame Buffer Compression (AFBC) (as described in US A1 2013/0034309) prior to being stored in memory. Thus, in one embodiment, at least one or each decoding stage may comprise an AFBC decoder for decoding one or more of the input surfaces.

One or more or each decoded (e.g. decompressed) input surface may be a or the "final" output surface generated by the (first or second) display core (processing stage) in question, but in an embodiment the one or more or each decoded (e.g. decompressed) input surfaces are subjected to further processing by the display core in question (such as a composition operation) in order to generate a or the output surface.

In an embodiment, at least one or each processing stage also or instead, and in an embodiment also, comprises a rotation stage operable to rotate one or more surfaces, in an embodiment one or more of the (optionally decoded) input surfaces, e.g. to generate one or more rotated input surfaces. This is particularly useful where, for example, it is necessary and/or desired to rotate one or more of the input surfaces (windows), e.g. prior to compositing or otherwise. At least one or each rotation stage may be operable to rotate one or more of the input surfaces by any suitable and desired amount, such as, for example 90°, 180° and/or 270°.

The one or more or each rotated input surfaces may be a or the "final" output surface generated by the (first or second) display core (processing stage) in question, but in an embodiment the one or more rotated input surfaces is subjected to further processing by the display core in question in order to generate a or the output surface.

In an embodiment, at least one or each processing stage also or instead, and in an embodiment also, comprises one or more scaling stages or engines operable to scale (e.g. upscale and/or downscale) one or more surfaces, e.g. to generate one or more scaled surfaces. Each scaling stage may be operable to scale any one, some, or all of the (optionally modified) input surfaces and/or an output surface such as an (optionally modified) composited output surface.

In an embodiment, at least one or each of the one or more scaling stages are operable to scale one or more of the (optionally modified, e.g. decoded (e.g. decompressed) and/or rotated) input surfaces, e.g. so as to generate one or more scaled input surfaces. This is particularly useful where, for example, it is desired to scale one or more of the input surfaces, e.g. prior to composition, passing it to the other display core, or otherwise.

Additionally or alternatively, at least one or each of the one or more scaling stages may be operable to scale an output surface such as the (optionally modified) composited output surface, e.g. to generate a scaled composited output surface. This is particularly useful where, for example, it is desired to scale a composited output surface, e.g. prior to displaying it, passing it to the other display core, or otherwise.

The one or more or each scaled surfaces may be a or the "final" output surface generated by the (first or second) display core (processing stage) in question, or the one or more or each scaled surfaces may be subjected to further processing by the display core in question in order to generate a or the output surface.

At least one or each scaling stage may be configured to scale (e.g. upscale or downscale) surfaces by a set degree or factor that cannot be changed. However, in an embodiment, at least one or each scaling stage is configured to scale (e.g. upscale and/or downscale) surfaces to any desired degree or factor (or by one or more of a limited number of degrees or factors) (and the degree of scaling is in an embodiment selectable in use).

In an embodiment, at least one or each processing stage also or instead, and in an embodiment also, comprises a de-tiler stage operable to convert data in the form of one or more blocks of data (tiles) to data in the form of one or more lines of data, e.g. for further processing and/or display.

At least one or each of the display cores (processing stages) may further comprise one or more layer pipelines operable to perform one or more processing operations on one or more input surfaces, as appropriate, e.g. before providing the one or more processed input surfaces to the scaling stage and/or the composition unit, or otherwise. At least one or each of the display cores may comprise plural layer pipelines, such as two, three or more layer pipelines. One or more of the layer pipelines may comprise a video layer pipeline and/or one or more of the layer pipelines may comprise a graphics layer pipeline. Each of the one or more layer pipelines may be operable, for example, to provide pixel processing functions such as pixel unpacking, colour conversion, (inverse) gamma correction, and the like.

At least one or each of the display cores (processing stages) may further comprise one or more latency buffers, e.g. in the form of one or more FIFO (first-in-first-out) stages, e.g. for buffering input surfaces, or otherwise, as appropriate. Each layer pipeline in an embodiment has its own latency buffer or a portion of the one or more latency buffers allocated to it. Each layer pipeline's latency buffer may be configured to buffer, for example, a single line (e.g. raster line) of data.

In an embodiment, at least one or each processing stage also or instead, and in an embodiment also, comprises one or more "post-processing" stages, e.g. in the form of a post-processing pipeline, operable to selectively perform one or more processing operations on one or more surfaces, e.g. to generate a post-processed surface. At least one or each processing stage may be configured such that the one or more post-processing stages receives any of the (modified) input surfaces and/or an output surface such as the (modified) composited output surface, but in an embodiment, at least one or each of the one or more post-processing stages is operable to receive and (selectively) process the (composited) output surface generated by the first processing stage, e.g. to generate a post-processed composited output surface.

At least one or each of the one or more post-processing stages may comprise, for example, a colour conversion stage operable to carry out colour conversion on a surface, a dithering stage operable to carry out dithering on a surface, and/or a gamma correction stage operable to carry out gamma correction on a surface.

The one or more or each post-processed surfaces may be subjected to further processing by the (first or second) display core (processing stage) in question in order to generate a or the output surface, but in an embodiment the one or more post-processed surfaces may be a or the "final" output surface generated by the display core in question.

In another embodiment, at least one or each processing stage also or instead, and in an embodiment also, comprises a compression stage operable to compress one or more surfaces, e.g. to generate one or more compressed surfaces. Each compression stage may be operable to compress any one, some, or all of the (optionally modified) input surface(s) and/or an (optionally modified) (composited) output surface.

Thus, in an embodiment, at least one or each compression stage is operable to compress one or more of the (optionally modified, e.g. decoded (e.g. decompressed), rotated and/or scaled) input surfaces, e.g. so as to generate one or more compressed output surfaces. Additionally or alternatively, at least one or each compression stage may be operable to compress an (optionally modified) (composited) output surface, e.g. to generate a compressed (composited) output surface. This is particularly useful where, for example, it is desired to compress the one or more output surfaces, e.g. prior to display.

The one or more or each compressed surfaces may be subjected to further processing by the (first or second) display core (processing stage) in question in order to generate a or the output surface, or in an embodiment the one or more compressed surfaces may be a or the "final" output surface generated by the display core in question.

As will be appreciated from the above, at least one or each processing stage of each display core of the present embodiment may, and in an embodiment does, comprise a plurality of processing stages or elements, and in an embodiment comprises one or more of, and in an embodiment all of: a decoding stage (decoder), a rotation stage (engine), a de-tiler stage, one or more layer pipelines, one or more latency buffers, a scaling stage (engine), a composition stage (engine), one or more post-processing stage or stages, and optionally a compression stage. Correspondingly, the processing of the at least one input surface to generate an output surface in an embodiment comprises one or more of and in an embodiment all of: decoding, rotation, de-tiling, layer processing, buffering, scaling, composition, post-processing and optionally compression.

At least one or each display core may be such that (only) particular surfaces are (always) sent to (and received and processed by) any one or more of the various stages of the display controller (processing stage) (e.g. the composition stage and/or the scaling stage) and/or the other display core via the internal data path. However, in an embodiment, at least one or each display core may be configured so as to be able to selectively send one or more of the surfaces to any one or more of the various stages of the processing stage (e.g. the composition stage and/or the scaling stage) and/or to the other display core via the internal data path, e.g. such that any one or more of the surfaces may be selectively received by the composition stage and composited and/or the scaling stage and scaled (up-scaled or down-scaled) and/or the other display core and processed, e.g. as appropriate and/or desired.

To achieve this (and otherwise), in an embodiment, the display controller further comprises one or more data flow controllers operable to selectively transmit (direct) one or more surfaces to the various stages of the display controller. The one or more data flow controllers may be provided as part of an overall (centralised) control module of the display controller, or may be provided as one or more separate units that are in an embodiment controlled by an overall control module of the display controller. Equally, the data flow controller may itself be a single unit or may comprise multiple units, i.e. may be distributed. Other arrangements would, of course, be possible.

The or each data flow controller may be operable to selectively transmit one or more of the (optionally modified, e.g. decoded (e.g. decompressed), rotated, and/or scaled) input surfaces and/or an output surface such as the (optionally modified) composited output surface.

In an embodiment, the or each data flow controller is capable of directing the data flow for (e.g. input) surfaces individually, i.e. such that different surfaces can be directed to different processing stages, independently of each other.

The or each data flow controller is in an embodiment operable to selectively direct (transmit) one or more surfaces to any part (stage) of each display core as appropriate. In one embodiment, the or each data flow controller is configured to selectively transmit surfaces to the composition stage and/or to first scaling stage and/or to the output stage and/or to the other display core via the internal data path and/or to the write-out stage.

Thus, for example, in one embodiment, the or each data-flow controller is operable to transmit one or more of the (modified) input surfaces to the composition stage. In another embodiment, the or each data flow controller is operable to transmit one or more of the (modified) input surfaces to the scaling stage. In this embodiment, the or each data flow controller may be further operable to transmit one or more scaled input surfaces from the scaling stage (e.g. that correspond to the one or more input surfaces that was transmitted to the scaling stage) to the composition stage for composition.

In one embodiment, the or each data flow controller is operable to transmit the (modified) composited output surface to the output stage and/or to the other display core via the internal data path and/or to the write-out stage. In another embodiment, the or each data flow controller is operable to transmit the (modified) composited output surface to the scaling stage. In this embodiment, the scaling stage will then in an embodiment scale the received composited output surface, and transmit the scaled composited output surface to the output stage and/or to the other display core via the internal data path and/or to the write-out stage, directly or via the data flow controller.

In embodiments where the first and/or second display core comprises a compression stage, the or each data flow controller may be configured to selectively transmit surfaces to the or each compression stage.

Each output stage of the display controller of the technology described herein may be any suitable such output stage operable to provide an output surface for display to a display, e.g. to cause the output surface for display to be displayed on the display (to act as a display interface). Each output stage in an embodiment comprises appropriate timing control functionality (e.g. it is configured to send pixel data to the display with appropriate horizontal and vertical blanking periods), for the display.

Each output stage is in an embodiment operable to receive the output surface for display before providing it to the display, in an embodiment directly from within (internally to) the display core in question, and in an embodiment directly from the processing stage in question, i.e. without the output surface for display being output from the display controller or being stored in external memory.

Each output surface for display should be and in an embodiment is an output surface generated by the (first or second) display core (processing stage). In an embodiment, at least one or each output surface for display is a or the (optionally compressed) composited output surface (generated by a composition stage, in an embodiment by the first composition stage) or the (optionally compressed) post-processed composited output surface (generated by one or more post-processing stages, in an embodiment by the one or more first post-processing stages).

Each display that each display core of the technology described herein is used with may be any suitable and desired display, such as for example, a screen (such as a panel) or a printer. In an embodiment, the first display comprises the overall data processing system's (device's) local display (screen) and the second display comprises an external display. However, it would also be possible for the first display to comprise an external display and for the second display to comprise the overall data processing system's (device's) local display (screen).

The refresh rates at which the first and second display are operated may be the same or different. Similarly, the resolution and/or aspect ratio at which the first and second display are operated may be the same or different.

The first display core of the technology described herein comprises a write-out stage. Only the first display core of the display controller of the technology described herein may comprise a write-out stage, or in an embodiment, the second display core may also comprise a (second) write-out stage, e.g. that is operable to write data of an output surface to external memory.

The or each write-out stage may be any suitable such stage that can write data of an output surface to external memory. In one embodiment, at least one or each write-out stage comprises a write controller, such as a Direct Memory Access (DMA) write controller.

The or each write-out stage (write controller) is in an embodiment configured to receive data of the output surface before writing it to external memory, in an embodiment directly from within (internally to) the display core in question, and in an embodiment directly from the processing stage of the display core in question, i.e. without the output surface data being output from the display controller or being stored in external memory.

The output surface for which data is written to the external memory by the or each write-out stage should be and in an embodiment is an output surface generated by a processing stage of the display core in question. In an embodiment, the output surface for which data is written to external memory by the or each write-out stage is a (optionally compressed) composited output surface (generated by a composition stage) or a (optionally compressed) scaled composited output surface (generated by a scaling stage).

In an embodiment, one or more or each output surface comprises an array of data. The or each array of data in an embodiment comprises an array of plural data positions, with each data position taking a particular data (e.g. colour)

value. In an embodiment, the data comprises image data, i.e. one or more arrays of image (colour) data, e.g. one or more frames, for display or otherwise.

In an embodiment, one or more or each surface is provided as (takes the form of) (comprises) plural data words (e.g. such as plural Advance eXtensible Interface (AXI) words), where each word in an embodiment includes data in respect of multiple data positions of the data array.

Accordingly, in an embodiment, a write-out stage writing data of an output surface to memory in an embodiment comprises the write-out stage writing one or more data words of the output surface to memory. Correspondingly, the write-out stage in an embodiment generates one or more write transactions, e.g. respectively associated with one or more data words of the input surface to be written to memory.

In an embodiment one or each write-out stage comprises a buffer memory, i.e. local (internal) memory, operable to buffer (store) data (e.g. transactions and/or data words) of the one or more output surfaces to be written to external memory by the write-out stage, e.g. before that data is written to external memory.

In these embodiments, the external memory should be and is in an embodiment one or more memories external to the display controller, to which the or each write-out stage can write data, such as a frame buffer. The external memory is in an embodiment provided as or on a separate chip (monolithic integrated circuit) to the display controller. The external memory in an embodiment comprises a main memory (e.g. that is shared with the central processing unit (CPU)), e.g. a frame buffer, of the overall data processing system.

The various stages of the display controller of the technology described herein may be implemented as desired, e.g. in the form of one or more fixed-function units (hardware) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various stages of the technology described herein may be provided as separate circuit elements to one another. Additionally or alternatively, some or all of the stages may be at least partially formed of shared circuitry.

One or more of the various stages of the technology described herein may be operable to always carry out its function on any and all received surfaces. Additionally or alternatively, one of more of the stages may be operable to selectively carry out its function on the received surfaces, i.e. when desired and/or appropriate.

The internal data path for passing data of an output surface from the first display core to the second display core may comprise any suitable such data path. The internal data path should be (and in an embodiment is) internal to the chip (monolithic integrated circuit) as or on which the first and second display cores are provided. Thus, the second display core is able to receive the output surface from the first display core directly from within (internally to) the display controller, i.e. without the output surface being output from the display controller or being stored in external memory.

The data that is passed from the first display core to the second display core is in an embodiment pixel data, in an embodiment RGB pixel data or YUV pixel data. The data that is passed from the first display core to the second display core may comprise uncompressed data or compressed data.

The output surface for which data is passed from the first display core to the second display core may be any suitable output surface. The output surface should be and in an embodiment is an output surface generated by the first display core (processing stage). In an embodiment, the output surface is an (optionally modified, optionally compressed) composited output surface generated by the first composition stage.

In an embodiment, one or more or each output surface comprises an array of data. The or each array of data in an embodiment comprises an array of plural data positions, with each data position taking a particular data (e.g. colour) value. In an embodiment, the data comprises image data, i.e. one or more arrays of image (colour) data, e.g. one or more frames, for display or otherwise.

In an embodiment, one or more or each surface is provided as (takes the form of) (comprises) plural data words (e.g. such as plural Advance eXtensible Interface (AXI) words), where each word in an embodiment includes data in respect of multiple data positions of the data array.

Accordingly, in an embodiment, a display core passing data of an output surface to the other display core via the internal data path in an embodiment comprises the display core passing one or more data words for an output surface to the other display core via the internal data path.

The internal data path may connect any part of the first display processing core with any part of the second display processing core.

For example, in one embodiment, the internal data path connects the processing stage of the first display core to the processing stage of the second display core, i.e. the output surface is passed from the first processing stage to the second processing stage via the internal data path.

In this case, the internal data path may connect any one of the various stages of the processing stage of the first display core (e.g. the particular stage that generates the output surface) to the processing stage of the second display core, i.e. the output surface may be passed to the second processing stage via the internal data path from any one of the various stages of the first processing stage, i.e. (directly or indirectly) from the particular stage that generates the output surface (e.g. the first decoding stage, the first composition stage, the first scaling stage, the first rotation stage and/or the first compression stage, etc.). Thus, the internal data path may be connected to (interface with) the first decoding stage, the first composition stage, the first scaling stage, the first rotation stage, and/or the first compression stage.

Similarly, the internal data path may connect the first display core to any one of the various stages of the processing stage of the second display core, i.e. the output surface may be passed from the first display core to any one of the various stages of the second processing stage. Thus, the internal data path may be connected to (interfaced with) the decoding stage, the composition stage, the scaling stage, the rotation stage, and/or the compression stage of the second display core, i.e. the output surface may be passed from the first display core to the decoding stage, the composition stage, the scaling stage, the rotation stage and/or the compression stage, etc. of the second display core.

However, in an embodiment, the internal data path connects the write-out stage of the first processing core to the second processing core, i.e. the output surface may be passed to the second processing core via the internal data path from the write-out stage of the first processing core. Thus, the internal data path may be connected to (interface with) the first write-out stage.

Similarly, in an embodiment, the internal data path connects the first processing core to the input stage of the second display core, i.e. the output surface may be passed from the first display core to the input stage of the second display core. Thus, the internal data path may be connected to (interface with) the second input stage.

Thus, according to an embodiment, the internal data path is connected to (interfaced with) the write-out stage of the first display core and the input stage of the second display core, i.e. the (pixel) data of the output surface is passed from the write-out stage of the first display core to the input stage of the second display core via the internal data path.

It would also be possible for the display controller to comprise a second internal data path for passing data of an output surface from the second display core to the first display core (and in one embodiment this is the case). This can facilitate an even greater degree of control and flexibility in the types of operation that can be carried out by the display controller. In this case, data of an output surface from either core can be passed to the other core.

The second internal data path may comprise any suitable such data path, but in an embodiment corresponds to (is substantially the same as) the internal data path as described above. Thus, the second internal data path should be (and in an embodiment is) internal to the chip (monolithic integrated circuit) as or on which the first and second display cores are provided. Similarly, the data is in an embodiment (optionally compressed) pixel data, in an embodiment RGB pixel data or YUV pixel data, as appropriate.

The output surface for which data is passed from the second display core to the first display core should be and in an embodiment is an output surface generated by the second processing stage, such as an (optionally compressed) output surface, e.g. an (optionally compressed) composited output surface.

In an embodiment, the second internal data path is connected to (interfaced with) a write out stage of the second display core and the input stage of the first display core.

In an embodiment, the display controller of the technology described herein forms part of a data processing system. Thus, another embodiment of the technology described herein comprises a data processing system comprising the display controller described above.

The data processing system in an embodiment comprises a host processor (e.g., and in an embodiment, a CPU) that controls the operation of the display controller, e.g., and in an embodiment, by executing a driver for the display controller, e.g., and in an embodiment, to generate appropriate commands to the display controller to operate as required by an application executing on the host processor.

The data processing system may and in an embodiment does comprise one or more of, and in an embodiment all of: a central processing unit, a graphics processing unit, a video processor (codec), a system bus, a memory controller, and any additional elements.

The display controller and/or data processing system may be, and in an embodiment is, configured to communicate with one or more of (and the technology described herein also extends to an arrangement comprising one or more of): an external memory (e.g. via the memory controller), one or more local displays, and/or one or more external displays.

Thus, a further embodiment of the technology described herein comprises a data processing system comprising:
a main memory;
a display;
one or more processing units operable to generate input surfaces for display and to store the input surfaces in the main memory; and
a display controller, the display controller comprising:
a first display processing core comprising a first input stage operable to read at least one input surface, a first processing stage operable to process one or more input surfaces to generate an output surface, a first output stage operable to provide an output surface for display to a first display, and a first write-out stage operable to write data of an output surface to external memory;
a second display processing core comprising a second input stage operable to read at least one input surface, a second processing stage operable to process one or more input surfaces to generate an output surface, and a second output stage operable to provide an output surface for display to a second display; and
an internal data path for passing data of an output surface from the first display core to the second display core.

As will be appreciated by those skilled in the art, these embodiments of the technology described herein can and in an embodiment do include one or more, and in an embodiment all, of the optional features of the technology described herein.

The display controller of the technology described herein may be operated in any appropriate and desired manner.

The operation of the display controller of the technology described herein may be fixed and unchangeable, but in an embodiment the display controller is operable in plural modes of operation, i.e. the display controller is in an embodiment controllable and/or programmable to operate in plural modes of operation as appropriate and/or desired.

In an embodiment, the mode of operation of the display controller is controlled by an application, e.g. running on a host processor, in an embodiment by the application generating instructions which are interpreted by a driver for the display controller (that is running on the host processor) to generate appropriate commands to the display controller to operate as required by the application.

In an embodiment, each of the at least one input surfaces can be individually, in an embodiment selectively, subjected to decoding (e.g. decompression) and/or rotation and/or scaling, in an embodiment before being composed and/or compressed and/or passed to the other display core. In an embodiment, a or the (modified) input surface and/or the composited output surface can be selectively subjected to post-processing and/or scaling and/or compression, in an embodiment before being provided to the (first or second) display and/or being passed to the other display core and/or before being written to external memory.

In an embodiment, all of the processing carried out by the display controller is performed after reading the at least one input surface from memory only once, i.e. the display controller is in an embodiment configured so as to pass the various input and/or intermediate surfaces between each of its stages without outputting the surfaces from the display controller or storing them in external memory. This then means that, for various modes of operation of the display controller, only a single read of each input surface from main memory is required.

In one embodiment (mode of operation), the display controller may be used to provide output surfaces to one or plural displays, e.g. to the first (local) display and/or the second (external) display. In these embodiments, the at least one input surfaces that are read by the or each input stage are in an embodiment selectively subjected to decoding (e.g. decompression) and/or rotation and/or scaling and/or composition and/or post-processing and/or compression, as described above, before being provided to the first and/or second display for display.

As discussed above, in an embodiment, the first and second display cores are operated to provide the same or a similar output surface to both the first and second displays (i.e. in a "clone" mode).

In these embodiments, the first display core may be, and is in an embodiment, operated to read in one or more input surfaces, perform any processing operation(s) as desired (such as decoding, decompression, scaling and/or composition) on the one or more input surfaces to generate an output surface, provide the output surface for display to the first display, and to also provide the (optionally modified, e.g. scaled) output surface to the second display core (e.g., and in an embodiment, for display).

In this arrangement, the first display core may provide the output surface to the second display core either via the internal data path, or by writing the output surface out to external memory (from where it may then be read as an input surface by the second display core).

It would be possible in this regard, e.g., for a given output surface, for the first display core to provide the output surface to the second display core solely via the internal data path (and where it is possible to do that, that is in an embodiment done), or, conversely, to provide the output surface to the second display core solely by writing the output surface out to external memory.

However, as discussed above, the Applicants have recognised that in practice a combination of these two methods may be preferable to use for providing the output surface to the second display core.

In particular, the Applicants have recognised that it is generally preferable for first display core to pass as much data of the output surface as possible to the second display core via the internal data path (instead of writing that data to external memory), since this will reduce the bandwidth requirements (and power consumption) of the overall data processing system.

However, the Applicants have also recognised that there may be situations where it is in fact preferable to write at least some data of the output surface to main memory.

In particular, it may be the case that output surface data generated by the first display core is generated at a different time to (before or after) the time at which the second display core requires the output surface data, e.g. due to the displays operating with different refresh rates, due to upstream latency in the overall data processing system, or otherwise. In this case, it may not be appropriate to transfer the data of the output surface from the first display core to the second display core directly via the internal data path, but rather providing that output surface data via external memory may be more appropriate.

Thus, by allowing the first display core to both pass data of an output surface to the second display core via the internal data path, and to write data of the output surface to external memory, a "back-up" is effectively provided that can be used in the event that the appropriate data is not available to be transferred (or received) via the internal data path.

Thus, in an embodiment, the display controller is operable to (and comprises processing circuitry operable to), when operating in a clone mode in which data of an output surface generated by the first display core is to be provided to the second display core, selectively provide data of the output surface to the second display core via the internal data path or by writing data for the output surface to external memory.

Correspondingly, in an embodiment, the method of the technology described herein comprises the first display core providing data of an output surface generated by the first display core to the second display core selectively via the internal data path and by writing data for the output surface to external memory.

Thus, in an embodiment, the display controller further comprises:

processing circuitry operable to determine whether to write data of the output surface to external memory and/or to pass data of the output surface from the first display core to the second display core via the internal data path.

Correspondingly, in an embodiment, the method comprises:

determining whether to write data of the output surface to external memory and/or to pass the data of the output surface from the first display core to the second display core via the internal data path.

When (if) it is determined to write the data of the output surface to external memory, then the data of the output surface is in an embodiment written to external memory.

When (if) it is determined to pass the data of the output surface from the first display core to the second display core via the internal data path, then the data of the output surface is in an embodiment passed from the first display core to the second display core via the internal data path.

Thus, an output surface is in an embodiment provided to the second display core by writing some data (e.g. one or more data words) of the output surface to external memory (and the second display core then reading that data from external memory), and by passing some data (e.g. one or more other data words) of the output surface to the second display core via the internal data path.

Correspondingly, the second display core may receive the (e.g. data words of the) output surface directly from the internal data path and/or by reading data from external memory. It may, and in an embodiment does, then process (e.g. post-processes, etc.) the output surface to generate an (post-processed) output surface for display, and provide the (post-processed) output surface for display to the second display.

Thus, the second display core is in an embodiment operable to, and operates to, receive data of an output surface generated by the first display core selectively via the internal data path or by reading that data from external memory.

In an embodiment, for each data "unit" (e.g. data word) of the output surface to be provided (passed) to the second display core, a determination is made as to whether the first display core should write that data to external memory and/or to pass that data to the second display core via the internal data path.

The selection of whether to send the output surface data via the internal data path or via the external memory to the second display core can be made as desired. In an embodiment, this is based on the data that is generated by the first display core (and so is currently available for transfer to the second display core) and the data that is required by the second display core for processing.

This may be determined as desired. In an embodiment it is done by considering one or more (e.g., and in an embodiment, the current) output surface data write transactions (write operations) of the first display core, and one or more (e.g. and in an embodiment the current) output surface data read transactions (read operations) of the second display core.

In an embodiment, the first display processing core (its write out stage) is configured to generate a write transaction to the external memory for an appropriate unit of data (e.g. a data word or words) that is generated for the output surface, and the second display processor is correspondingly configured to generate read transactions to external memory for reading data units (e.g. data words or words) of the output surface. However, before a write transaction to external memory is actually performed (i.e. the data is actually written to external memory), a check is made to determine if there is a corresponding read transaction for that data. If there is a corresponding read transaction, then the data is in an embodiment transferred to the second display core via the internal data path. The write transaction to external memory for that data may then be cancelled (and in one embodiment that is what is done), or, alternatively, it may still be performed.

While it would be possible simply to consider the immediate, current, first display core write operation for the output surface and correspondingly, the current second display core read operation for the output surface, to determine whether to send the output surface data via the internal data path or external memory, in an embodiment, the display controller is configured such that plural read and write operations (transactions) can be considered. This will then allow, as will be discussed further below, the internal data path to be used more frequently for transferring data of an output surface to the second display core.

In particular, in an embodiment (and as discussed above), the first display core is provided with a write buffer, e.g. for buffering (storing) data (e.g. data words) of the output surface that is (are) to be provided to the second display core (and correspondingly the method comprises buffering (storing) data (e.g. data words) of the output surface to be provided to the second display core). This allows data (word(s)) of the output surface which is not currently required by the second display core to be buffered (stored) (potentially) until it is (they are) required by the second display core.

In this case, when the data (word(s)) is required, then it is in an embodiment passed to the second display core via the internal data path.

Equally, in an embodiment (and as discussed above), the second display core is provided with a read buffer, e.g. for buffering (storing) read transactions generated by the second input stage (and correspondingly the method comprises buffering (storing) read transactions generated by the second input stage). This allows read transactions to be buffered (stored) (potentially) until the associated data has been generated by the first display core.

In this case, when the associated data (word(s)) is generated, then it is in an embodiment passed to the second display core via the internal data path.

(In this case, since the buffer(s) are necessarily limited in size, then writing data of the output surface to external memory will effectively be used as a "back-up" in the event that the buffer(s) becomes full, nearly full, or filled to or beyond a certain threshold.)

Thus, in these embodiments, the determination of whether to provide the output surface data to the second display core via the internal data path or via external memory is in an embodiment made by considering the current write transaction (e.g. associated with the current data word in question), one or more other (pending) write transactions, one or more (pending) read transactions, and/or the state of the one or more buffers.

In an embodiment, for each write transaction generated by the first display core (the first write-out stage) (e.g. in respect of a data word of the output surface to be written to external memory for subsequent reading in by the second input stage), it is determined whether or not that data is currently required by the second display core (input stage).

This is in an embodiment done by comparing the memory address of the write transaction with the memory address(es) of existing read transaction(s) generated by the second display core (input stage) (which will in an embodiment include, e.g. the current read transaction and/or any read transactions stored in the read buffer).

Where the write transaction corresponds to (e.g. has the same memory address as) an existing read transaction (the current read transaction or a read transaction stored in the read buffer), then it is in an embodiment determined that the data is currently required by second input stage.

Where it is determined that the "write" data is currently required by the second input stage, then the data (e.g. data word) associated with the write transaction is passed to the second display core (to the second input stage) via the internal data path.

In this case, the data is in an embodiment not written out to memory. However, it would also be possible to write the data to memory, if desired.

Where it is determined that the "write" data is not currently required by the second input stage, then the write transaction is in an embodiment stalled, in an embodiment by buffering (storing) the transaction and/or data (e.g. data word) associated with the write transaction in the write buffer, e.g. until it is required.

However, if the write buffer is full or close to full (is filled at or beyond a particular, in an embodiment selected, threshold), then the data (e.g. data word) associated with the write transaction is in an embodiment written out to external memory. The data is in an embodiment then read in by the second display core (input stage) from the external memory when it is required, i.e. when the second display core (input stage) generates a corresponding read transaction.

Similarly, if it is determined that the write "data" will not be required by the second input stage for a particular, in an embodiment selected, in an embodiment relatively large, amount of time (e.g. such that the data would be stalled in the write buffer for a significant amount of time), then the data (e.g. data word) associated with the write transaction is in an embodiment written to external memory. The data is in an embodiment then read in by the second display core (input stage) when it is required, i.e. when the second display core (input stage) generates a corresponding read transaction.

In an embodiment, when the write buffer is filled beyond a particular, in an embodiment selected threshold, then one or more write transactions (data of write transactions) within the write buffer may be evicted from the write buffer, i.e. to free up space in the write buffer, in an embodiment by writing data associated with the write transaction to external memory.

Similarly, in an embodiment, for each read transaction generated by the second display core (input stage) (e.g. in respect of a data word to be read from external memory), it is determined whether or not data in respect of that read transaction is currently available (has been generated by the first display core). This is in an embodiment done by comparing the memory address of the read transaction with the memory address(es) of existing pending write transaction(s) generated by the first display core (write-out stage)

(which will in an embodiment include, e.g. the current write transaction and any write transactions stored in the write buffer).

Where the read transaction corresponds to (e.g. has the same memory address as) a pending write transaction (i.e. as the current write transaction, or a write transaction stored in the write buffer), then it is in an embodiment determined that the data is currently available for transfer via the internal data path.

Where it is determined that the data is currently available, then the data (e.g. data word) associated with the write transaction is in an embodiment passed to the second display core via the internal data path.

In this case, the data is in an embodiment not written out to external memory. However, it would also be possible to write the data out to memory.

Where it is determined that the data is not currently available (has not been generated by the primary display core), then the read transaction is in an embodiment stalled, e.g. by buffering (storing) the read transaction in the read transaction buffer, e.g. until the data becomes available (i.e. is generated by the first processing core).

When the data becomes available (i.e. is generated by the first processing core), then the data (e.g. data word) is in an embodiment passed to the secondary display core via the internal data path. In this case, the data is in an embodiment not written out to external memory. However, it would also be possible to write the data out to memory.

In an embodiment, where it is determined that the data is available (i.e. has been generated by the first processing core) and that data is stored in external memory, then the read transaction is processed by reading the data from memory.

As will be appreciated, by stalling read and/or write transactions in accordance with these embodiments, data (e.g. data words) for the output surface may be received by the second display core (input stage) out of order. Accordingly, the second display core's input stage's re-order buffer is in an embodiment used to appropriately buffer and re-order the output surface data (e.g. data words).

In an embodiment, when the re-order buffer is filled up to or beyond a particular, in an embodiment selected threshold, then data in respect of a current write transaction is in an embodiment written to external memory. The data is in an embodiment then read in by the second display core (input stage) when it is required (when the second display core generates a corresponding read transaction).

Similarly, in an embodiment, when the second display core's latency buffer(s) is filled up to or beyond a particular, in an embodiment selected, threshold, then data in respect of a current write transaction is written to external memory. The data is in an embodiment then read in by the second display core (input stage) when it is required (i.e. when the second display core generates a corresponding read transaction).

In these arrangements, where similar output surfaces are to be provided to plural (two) displays, the output surfaces for display may have different resolutions and/or aspect ratios, e.g. depending on the requirements of the displays.

However, in an embodiment, when operating in clone mode, the first and second displays are configured to have the same or similar aspect ratios. This may reduce the differences between the output surfaces that are generated and provided for display on the first and second displays, and therefore the amount of additional processing required in order to generate the output surface for display on the second display from the output surface generated by the first processing core (for display on the first display). This accordingly may reduce the likelihood of delays in the output surface generated by the first display core being available for transfer to the second display core. This in turn may reduce the memory bandwidth and power requirements of the overall data processing system.

Similarly, in an embodiment, the first and second displays are configured to have the same or similar refresh rates. This again may reduce the likelihood of any delay in the output surface generated by the first display core being available for transfer to the second display core. This in turn may reduce the memory bandwidth and power requirements of the overall data processing system.

In an embodiment, the second display core is configured to provide data to the second display data (slightly) after (behind) the first display core provides data to the first display. For example, the second display core may be configured to provide data to the second display one or more lines after (behind) or one or more frames after (behind) the first display core provides lines or frames to the first display. This may reduce the likelihood that the output surface generated by the first display core will not be available for transfer to the second display core in time. This in turn may reduce the memory bandwidth and power requirements of the overall data processing system.

Although as discussed above, in an embodiment, when data is transferred via the internal data path to the second display core, that data is not also written out to external memory, in another embodiment, an output surface is both provided to the second display core for processing (i.e. cloned), and also written out to external memory in its entirety. In this case, any data that is transferred to the second display core via the internal data path will also be written out to external memory as well, so as to provide the complete output surface in external memory.

Thus in an embodiment, data that is transferred directly from the first display core to the second display core via the internal data path is also written by the first display core to external memory. This will allow an output surface to be both cloned to the second display core, and also stored in external memory for, e.g., other purposes. (When writing the output surface to external memory it would be possible, if desired, to use other memory optimisation arrangements, such as identifying and avoiding writing similar regions of the output surface to memory, if desired.)

In some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry (hardware) that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the display controller and/or data processing system can otherwise include any one or more or all of the usual functional units, etc., that display controllers and/or data processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to FIGS. 3-9.

Figure 3:
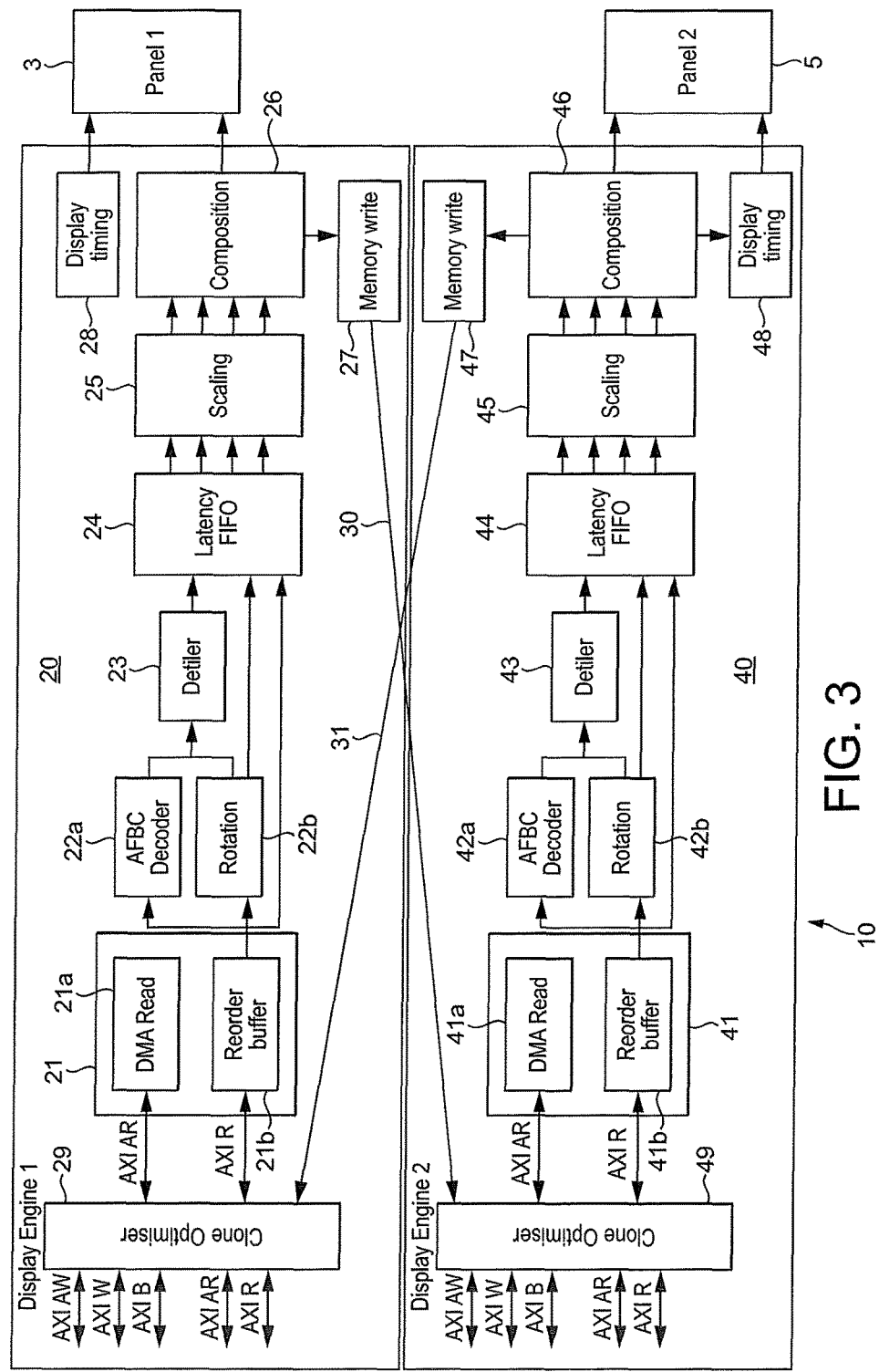
FIG. 3 shows schematically a display controller in accordance with an embodiment of the technology described herein.

FIG. 3 shows schematically a display controller 10 in accordance with an embodiment of the technology described herein. In FIG. 3, the boxes represent functional units of the display controller, while the arrowed lines represent connections between the various functional units.

In the present embodiment, the display controller 10 comprises a primary display core 20 and a secondary display core 40, i.e. the display controller is a dual core display controller. The primary 20 and secondary 40 display cores are provided as the same chip (monolithic integrated circuit), i.e. are integrated, and are substantially identical. As shown in FIG. 3, the primary display core 20 controls the overall data processing system's (e.g. mobile device, smartphone, tablet, etc.) local display 3, and the secondary display core 40 controls an external display 5, e.g. via a HDMI, MHL, Display Port, etc. interface.

It would also be possible for the display controller 10 to comprise one or more additional display cores, e.g. for controlling one or more additional displays.

As shown in FIG. 3, a first internal data path 30 connects the primary display core 20 to the secondary display core 40, and a second internal data path 31 connects the secondary display core 40 to the primary display core 20. However, it would be possible for only a single internal data path (e.g. only one of the first internal data path 30 and the second internal data path 31) to be provided. Similarly, where one or more additional display cores are provided, it would be possible to provide one or more additional internal data paths.

In the present embodiment, each display core 20, 40 comprises a read subsystem 21 in the form of a Direct Memory Access (DMA) read controller 21a, 41a and a re-order buffer 21b, 41b. Each read subsystem 21, 41 is configured to read one or more input surfaces from one or more frame buffers in a main memory 3 (not shown in FIG. 3) via a memory bus.

The input surfaces (layers) may comprise one or more video layers, e.g. generated by a video processor (codec), one or more graphics layers, e.g. graphics windows generated by a graphics processing unit (GPU), and so on.

Each input surface comprises an array of data, i.e. an array of plural data positions, with each data position taking a particular data (e.g. colour) value. Each input surface is read in by the read subsystem 21, 41 in the form of plural data words (e.g. plural Advance eXtensible Interface (AXI) words), where each word includes data in respect of multiple data positions of the data array. Accordingly, the read subsystem 21, 41 generates plural read transactions in order to read each data word of each input surface.

Each display core 20, 40 further comprises a frame buffer compression decoder 22a, 42a which can be used to (selectively) decode the received input surfaces as necessary, before onward transmission of the one or more input surfaces. Each decoder may comprise, for example, an ARM Frame Buffer Compression (AFBC) decoder (as described in US A1 2013/0034309).

Similarly, each display core 20, 40 may comprise a rotation unit 22b, 42b which can be used to selectively rotate one or more of the input surfaces as necessary before onward transmission of the one or more input surfaces.

Each display core 20, 40 further comprises a de-tiler 23, 43. Each de-tiler 23, 43 operates to convert data provided in a block (tile) pattern received from the frame buffer compression decoder 22a, 42a and/or the rotation unit 22b, 42b into data having a raster line pattern.

Each display core 20, 40 further comprises a latency FIFO (first-in-first-out) module 24, 44 which is used to buffer data words of the one or more input surfaces, e.g. as the data words are read from memory and/or decoded and/or rotated, etc., for latency hiding purposes. Each of the one or more input surfaces (layers) has its own portion of the FIFO module 24, 44 allocated to it, e.g. for buffering a single line (raster line) of data words.

Each display core 20, 40 of the present embodiment further comprises a scaling engine 25, 45. Each scaling engine 25, 45 operates to (selectively) scale (i.e. upscale or downscale) any one or more of received surfaces (frames) to generate a scaled surface (frame). Thus, each scaling engine 25, 45 may be operated to scale any one or more of the input surfaces to generate one or more scaled input surfaces. In the present embodiment, the degree to which a surface is scaled can be selected as desired, i.e. depending on the particular application, etc.

Each display core 20, 40 further comprises a composition unit 26, 46. Each composition unit 26, 46 operates to compose the two or more received input surfaces to generate a composited output frame, e.g. by appropriate alpha blending operations, etc.

In the illustrated embodiment, composited output frames from each composition unit 26, 46 may be provided to the associated display 3, 5 and/or to a write controller 27, 47.

Each display core 20, 40 also comprises appropriate display timing functionality 28, 48 so that each display core 20, 40 can send pixel data to its associated display 3, 5 with appropriate horizontal and vertical blanking periods.

For example, horizontal and vertical synchronization pulses (HSYNC, VSYNC) may be generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

It would also be possible for the display timing and data packing to take other forms, such as MIN DSI, HDMI, Display Port, etc.

In the present embodiment, each write controller 27, 47 takes the form of a DMA write controller. Each write controller 27, 47 is configured to write out received surfaces (frames) to external memory (e.g. frame buffer). Each write controller 27, 47 of the present embodiment is configured to receive surfaces (frames) for output from the associated composition unit 26, 46. Thus, each write controller 27, 47 may be operated to write out a composited output frame to main memory.

Each composited output frame will comprises an array of data, i.e. comprising an array of plural data positions, with each data position taking a particular data (e.g. colour) value. Each composited output frame is written to main memory in the form of plural data words (e.g. plural Advance eXtensible Interface (AXI) words), where each word includes data in respect of multiple data positions of the data array. Accordingly, each write controller 27, 47 generates plural write transactions in order to write each data word of each composited output frame to external memory.

As shown in FIG. 3, each display core 20, 40 further comprises a clone mode optimisation stage 29, 49. As will be described further below, when the display controller 10 is operating in a so-called "clone" mode, i.e. when the same (or similar) output frame is being displayed on both displays 3, 5, the clone mode optimisation stage 29, 49 operates to intercept and/or control write transactions and data words in respect of composited output frames from each write controller 27, 47.

As shown in FIG. 3, the internal data path 30 connects the primary display core's write controller 27 to the secondary display core's clone mode optimisation stage 49. Similarly, the second internal data path 31 connects the secondary display core's write controller 47 to the primary display core's clone mode optimisation stage 29.

Figure 4:
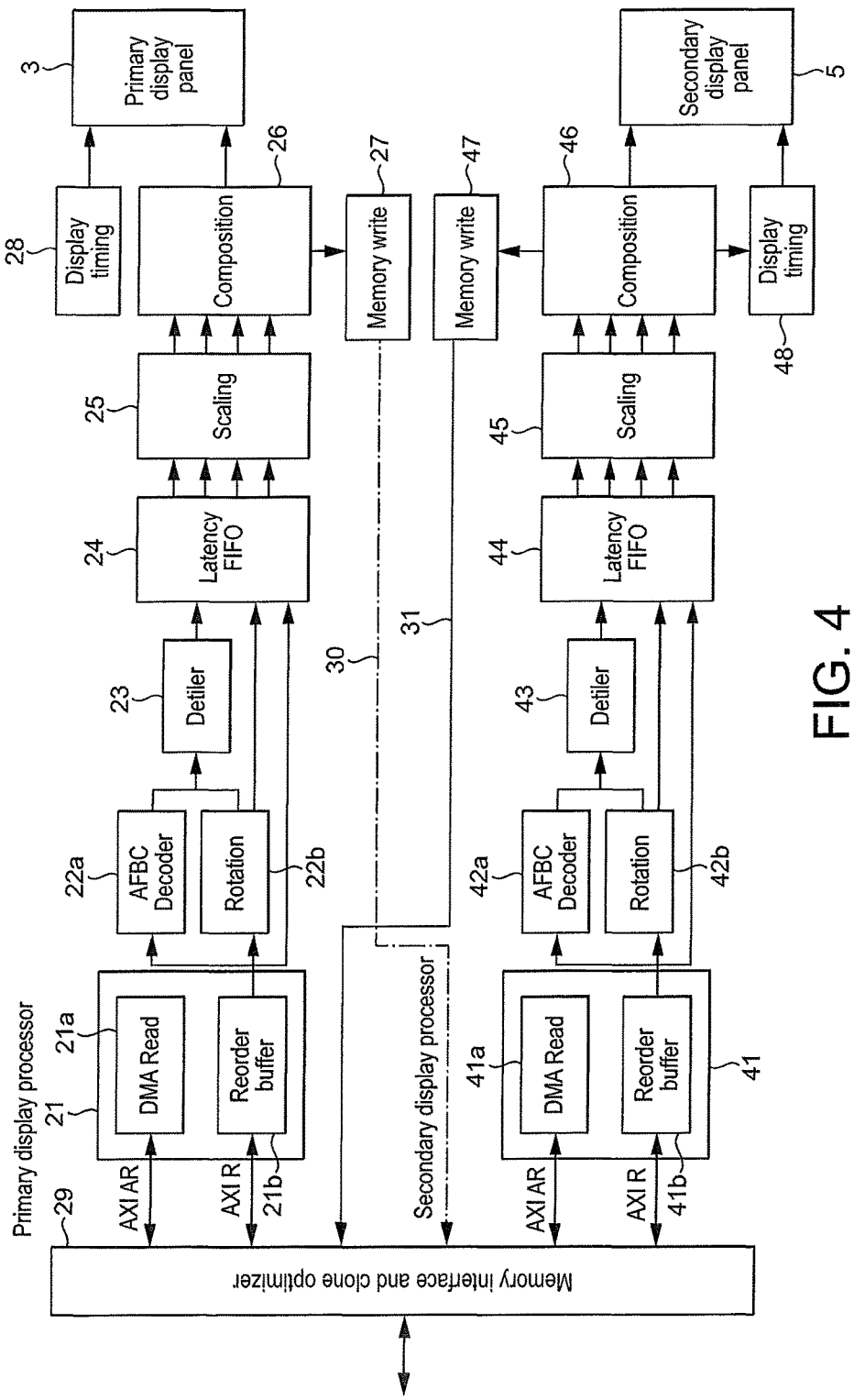
FIG. 4 shows schematically a display controller in accordance with another embodiment of the technology described herein.

FIG. 4 shows schematically a display controller 10 in accordance with an alternative embodiment of the technology described herein. The display controller 10 illustrated in FIG. 4 corresponds substantially to the display controller 10 of FIG. 3, except that the clone mode optimisation stages 29, 49 of FIG. 3 are merged into a single clone mode optimisation stage 29.

Figure 5:
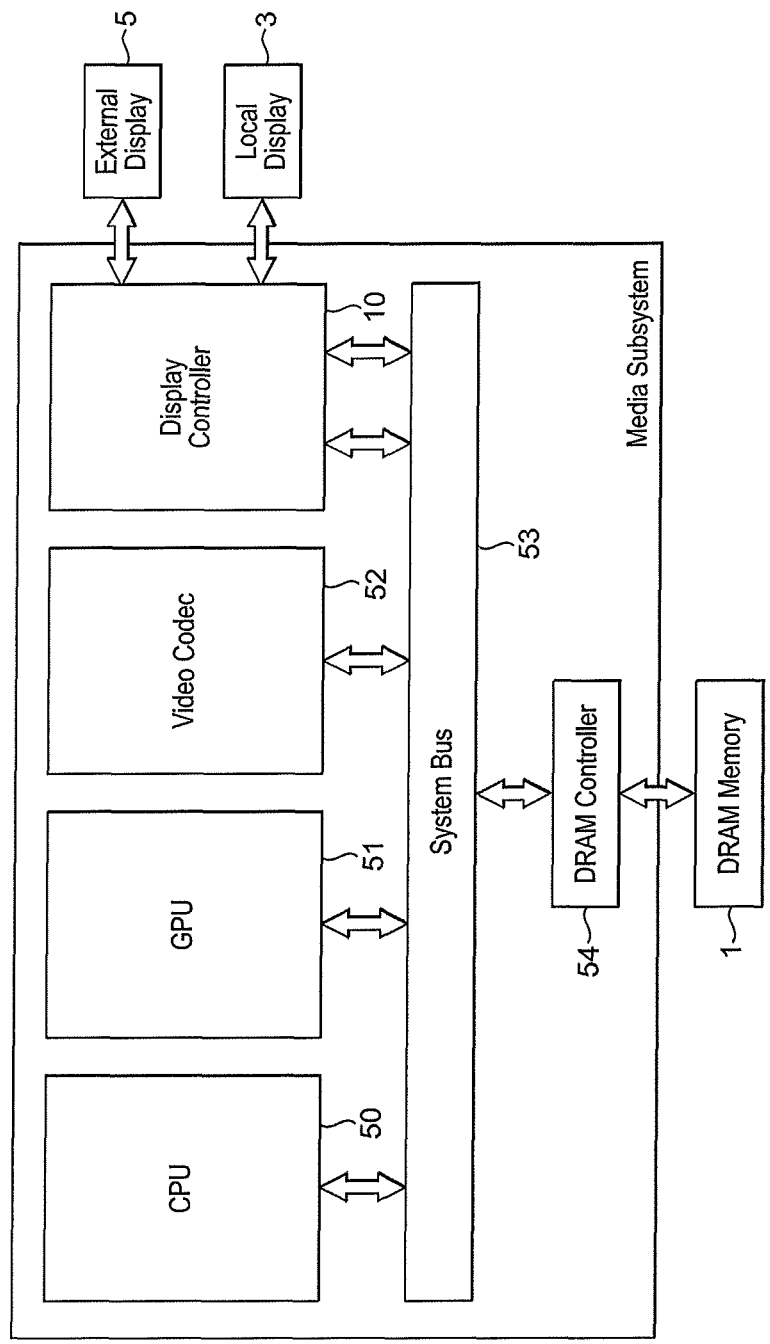
FIG. 5 shows schematically a data processing system in accordance with an embodiment of the technology described herein.

FIG. 5 shows a data processing system in accordance with an embodiment of the technology described herein. This comprises a central processing unit (CPU) 50, graphics processing unit (GPU) 51, video codec 52, memory controller 54, and the display controller 10. As shown in FIG. 5, these communicate via an interconnect 53 and have access to off-chip main memory 1. The display controller 10 is operable to communicate with (e.g. to cause output frames to be displayed on) local display device 3 and external display device 5.

Multiple different modes of operation can be performed by the display controller, e.g. by controlling data flows through the controller.

The data-flow control through the display controller 10 is controlled by an application, e.g. running on a host processor. The application generates instructions which are interpreted by a driver for the display controller (that is running on the host processor) to generate appropriate commands to the display controller 10 to operate as required by the application. Thus, different modes of operation such as clone mode can be enabled or disabled dynamically by software, depending on the requirements of the high-level application.

In each display core 20, 40 of the present embodiment, prior to composition, each input surface can be individually rotated, decoded, and/or pre-processed (e.g. linear and non-linear colour conversions, etc.). All of this processing may be carried out after a single read of the input frames from external memory.

Prior to composition, any one or more of the surfaces can be up or down-scaled by the appropriate scaling engine 25, 45. Depending on the software configuration, any of the input surfaces (e.g. video or graphics input layers) can be sent to each scaling engine 25, 45. The input surfaces may then be processed (scaled) and sent to be composed and displayed and/or sent to the other display core via the internal data path 30, 31. Again, the scaling operations carried out by each display core 20, 40 may be done after a single read of the input surfaces from external memory. No intermediate data need be written to external memory.

Thus, each display core 20, 40 of the present embodiment supports scaling of rotated, decoded surfaces and 3D video surfaces, all in single pass.

After composition, each output surface (e.g. RGB or YUV pixel stream) may be sent to the associated display 3, 5 via a post-processing pipeline (not shown), which can optionally apply colour conversions, dithering, and/or gamma correction, etc. The same composition result can also be sent to the write controller 27, 47, to be written to memory and/or to be sent to the other display core via the internal data path 30, 31.

Figure 6:
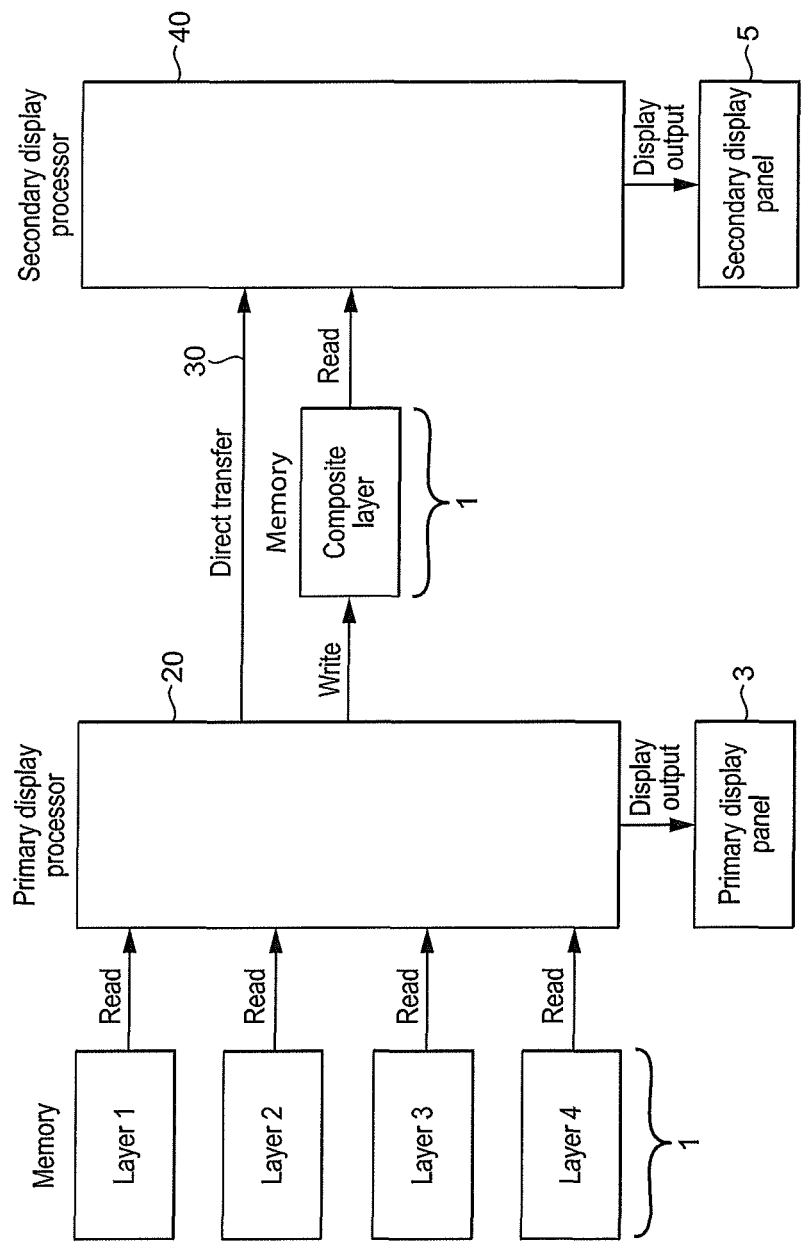
FIG. 6 shows schematically a dual-display composition process in accordance with an embodiment of the technology described herein.

FIG. 6 shows schematically a dual-display clone mode process in accordance with an embodiment of the technology described herein.

As shown in FIG. 6, plural input surfaces or layers (e.g. Layers 1-4) are generated (e.g. by CPU 50, GPU 51, video codec 52, etc.), and stored in main memory 1. The stored input surfaces are each read by the primary display core 20, combined (composited) to generate a composited output surface (frame), and then displayed on the primary display 3.

The combined (composited) surface generated by the primary display core 20 may also be passed to the secondary display core 40. In this case, the secondary display core 40 receives the composited output frame, optionally processes (e.g. scales or rotates) the surface for display, and then provides the surface for display on the secondary (e.g. external) display 5.

In the present embodiment, in order to pass the composited output surface from the primary display core 20 to the secondary display core 40, at least some data (data words) of the composited surface may be written to main memory 1. In this case, the secondary display core 40 then reads the composited output surface data from main memory 1.

Additionally or alternatively, at least some data (data words) of the composited surface may be passed directly to the secondary display core 40 via the internal data path 30. This then reduces the amount of data that has to be written to and read from memory 1. Accordingly, the memory bandwidth and power consumption of the overall data processing system is reduced.

When operating in the clone mode, it is generally preferable for primary display core 20 to pass as much data of the composited output frame as possible (as many data words as possible) to the secondary display core 40 via the internal data path 30 (instead of writing that data to main memory 1), since this will maximise reductions in the bandwidth requirements (and power consumption) of the overall data processing system.

However, there are situations where it is in fact preferable to write at least some data (data words) of the composited output frame to main memory 1.

In particular, it will often be the case that composited output frame data generated by the primary display core 20 is generated at a different time to (before or after) the time at which the secondary display core 40 requires the composited output frame data, e.g. due to the displays 3, 5 operating with different refresh rates, due to upstream latency in the overall data processing system, or otherwise.

Accordingly, the primary display core's write controller 27 is provided with a write buffer for buffering data words of the composited output frame that are to be provided to the secondary display core 40. This allows data words of the composited output frame which are not currently required by the secondary display core 40 to be buffered until they are required by the secondary display core 40. In this case, when a buffered data word is required, then it can be passed to the secondary display core 40 via the internal data path 30. (Correspondingly, the secondary display core's write controller 47 is provided with a write buffer for buffering data words of an output frame that are to be provided to the primary display core 20.)

In this regard, a separate write buffer may be provided, or a pre-existing write buffer, e.g. that is provided in order to cope with heavy loading on the memory system (e.g. due to read or write transactions originating from the display controller, and/or from other masters such as the CPU 50, GPU 51, video codec 52, etc. in the system), may be used. Where a pre-existing write buffer is used, then the size of that write buffer may be increased to allow more data to be buffered, e.g. to thereby increase the amount of data that will be passed to the other display core via the internal data path.

Equally, the secondary display core's read subsystem 41 and/or the clone optimiser 49 is provided with a read buffer for buffering read transactions generated by the secondary display core's read subsystem 41. This allows read transaction to be buffered until the associated data has been generated by the primary display core 20. In this case, when a data word associated with a buffered read transaction is generated, then the data word can be passed to the secondary display core 40 via the internal data path 30. (Equally, the primary display core's read subsystem 21 and/or the clone optimiser 29 is provided with a read buffer for buffering read transactions generated by the primary display core's read subsystem 21.)

As each display core 20, 40 can both pass data of an output surface to the other display core via an internal data path 30, 31, and write data of the output surface to external memory 1, a "back-up" is provided that can be used, e.g. in the event that the buffer(s) becomes full, or nearly full.

In the present embodiment, for each data word of the composited output frame to be provided (passed) to the secondary display core 40, the clone mode optimisation stage 29 determines whether the primary display core should write that data word to external memory 1 and/or pass that data word to the secondary display core 40 via the internal data path 30.

If it is determined to write the data word to main memory 1, then the data word is written to main memory 1. If it is determined to pass the data word from the primary display core 20 to the secondary display core 40 via the internal data path 30, then the data word is passed from the primary display core 20 to the secondary display core 40 via the internal data path 30.

The determination is made by considering the write transaction associated with the data word in question, one or more other (pending) write transactions, one or more (pending) read transactions, and/or the state of the one or more buffers.

For each write transaction generated by the primary display core's write controller 27 (i.e. in respect of a data word to be passed to the secondary display core's read subsystem 41), it is determined whether or not that data is currently required by the secondary display core's read subsystem 41. This is done by comparing the memory address of the write transaction with the memory address(es) of existing read transaction(s) generated by the secondary display core's read subsystem 41 (which will include the current read transaction and any read transactions stored in the read buffer).

Where the write transaction corresponds to (e.g. has the same memory address as) an existing read transaction (the current read transaction or a read transaction stored in the read buffer), then it is determined that the data is currently required by the secondary display core's read subsystem 41.

Where it is determined that the write transaction is currently required by the secondary display core's read subsystem 41, then the data word associated with the write transaction is passed to the secondary display core's read subsystem 41 via the internal data path 30, and the data word is not written out to memory 1.

Where it is determined that the write transaction is not currently required by the secondary display core's read subsystem 41, then the write transaction can be stalled by storing the data word associated with the write transaction in the write buffer, i.e. until it is required.

However, if the write buffer is full or close to full, then the data word associated with the write transaction can be written out to memory 1. This data will then be read in by the secondary display core's read subsystem 41 when it is required. It would also be possible write out the data word when the buffer is filled beyond a certain threshold, such as one quarter full, etc. This threshold may be set by software or hardware.

Similarly, if it is determined that the write transaction will not be required by the secondary display core's read subsystem 41 for a significant amount of time (such that the data would be stalled in the write buffer for a significant amount of time), then the data word associated with the write transaction is written out to memory 1. The data will then be read in by the display core's read subsystem 41 when it is required. The write buffer level, the read buffer level, and the read and write transaction memory addresses may be considered in order to determine whether the write transaction will be required soon (and if so, the transaction may then be buffered or otherwise).

If the write buffer begins to become full, then one or more write transactions within the write buffer may be evicted from the write buffer in order to free up space in the write buffer, e.g. by writing data associated with the write transaction to main memory 1.

Similarly, for each read transaction generated by the secondary display core's read subsystem controller 41 (e.g. in respect of a data word to be read from memory 1), it is determined whether or not data in respect of that transaction is currently available (has been generated by the primary display core 20). This is done by comparing the memory address of the read transaction with the memory address(es) of existing write transaction(s) generated by the primary display core's write controller 27 (which will include the current write transaction and any write transactions stored in the write buffer).

Where the read transaction corresponds to (e.g. has the same memory address as) an existing write transaction (i.e. as the current write transaction, or a write transaction stored in the write buffer), then it is determined that the data is currently available.

Where it is determined that the data is currently available, then the data word associated with the write transaction is passed to the secondary display core's read subsystem 41 via the internal data path 30. In this case, the data is not then written out to memory 1.

Where it is determined that the data is not currently available (has not been generated by the primary display core 20), then the read transaction can be stalled by storing the read transaction in the read transaction buffer, e.g. until the data becomes available (is generated).

When the data becomes available (is generated), then then the data word is passed to the secondary display core's read subsystem 41 via the internal data path 30, and the data is not written out to memory 1.

Where it is determined that the data is available (has been generated) and that data word has been stored in memory 1, then the read transaction is processed by reading the data word from memory 1.

As will be appreciated, by stalling read and write transactions, data of the composited output frame may be received by the secondary display core's read subsystem 41 out of order. Accordingly, the read subsystem's re-order buffer 41*b* is used to appropriately re-order the data words.

If the re-order buffer 41*b* is full or near to full, then data in respect of the current write transaction may be written to external memory 1. The data is then read in by the secondary display core's read subsystem 41 when it is required.

Similarly, if the secondary display core's latency buffer 44 is full or near to full, then data in respect of the current write transaction may be written to external memory 1. The data is then read in by the secondary display core's read subsystem 41 when it is required.

Figure 7:
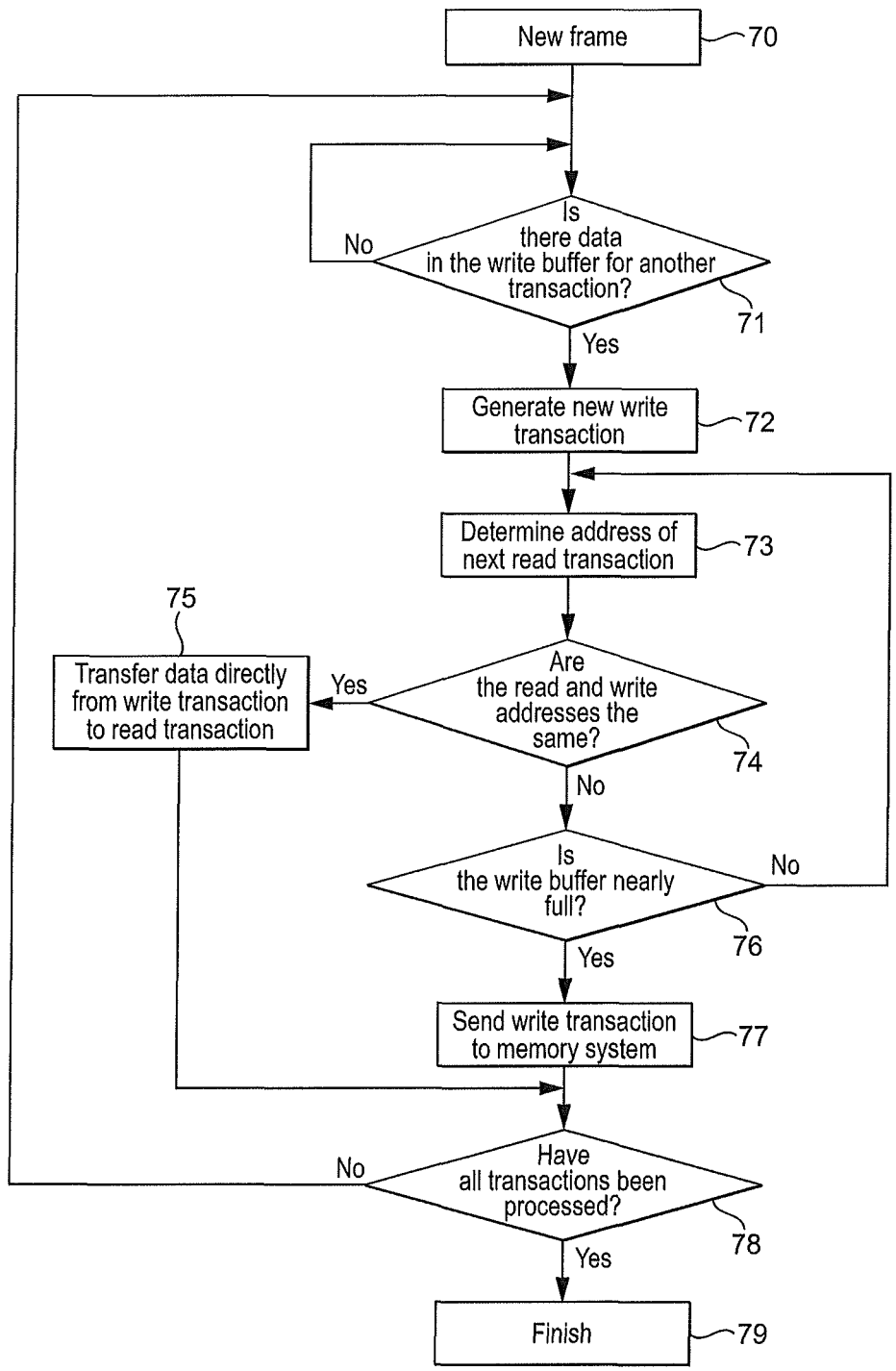
FIG. 7 shows schematically a write transaction process in accordance with an embodiment of the technology described herein.

FIG. 7 shows schematically a write transaction process in accordance with an embodiment.

The process is repeated for each new frame to be displayed, and begins at step 70 for each new frame.

As data for a composited output frame is generated by the composition engine 26, 46, it is determined whether there is sufficient data in the write controller's 27, 47 write buffer for another write transaction (step 71). This step is repeated until it is determined that there is sufficient data, and then a write transaction is generated (step 72).

The memory address of the next read transaction generated by the other display core's read subsystem 41, 21 is then determined (step 73), and it is determined whether that read transaction corresponds to (e.g. has the same memory address as) the current write transaction (step 74). Where the memory addresses corresponding (e.g. are the same), then the data in respect of the write transaction is transferred directly to the other display core's read subsystem 41, 21 via the internal data path 30, 31 (step 75), and the process continues at step 78.

Where, on the other hand, the memory addresses do not correspond (e.g. are not the same), it is then determined whether or not the write buffer is full or nearly full (step 76). If not, the process continues at step 73, i.e. by determining the memory address of the next read transaction and comparing that address with address of the current write transaction (step 74), etc.

Where it is determined in step 76 that the write buffer is full or nearly full, then the particular write transaction is sent to the memory system for writing the data to main memory (step 77).

It is then determined at step 78 whether all the write transactions for the frame in question have been processed. If not, then the process loops back to step 71 for the next write transaction. If, on the other hand, all the write transactions have been processed for the current frame, then the process is finished at step 79. The process may then be repeated for the next frame, and so on.

Figure 8:
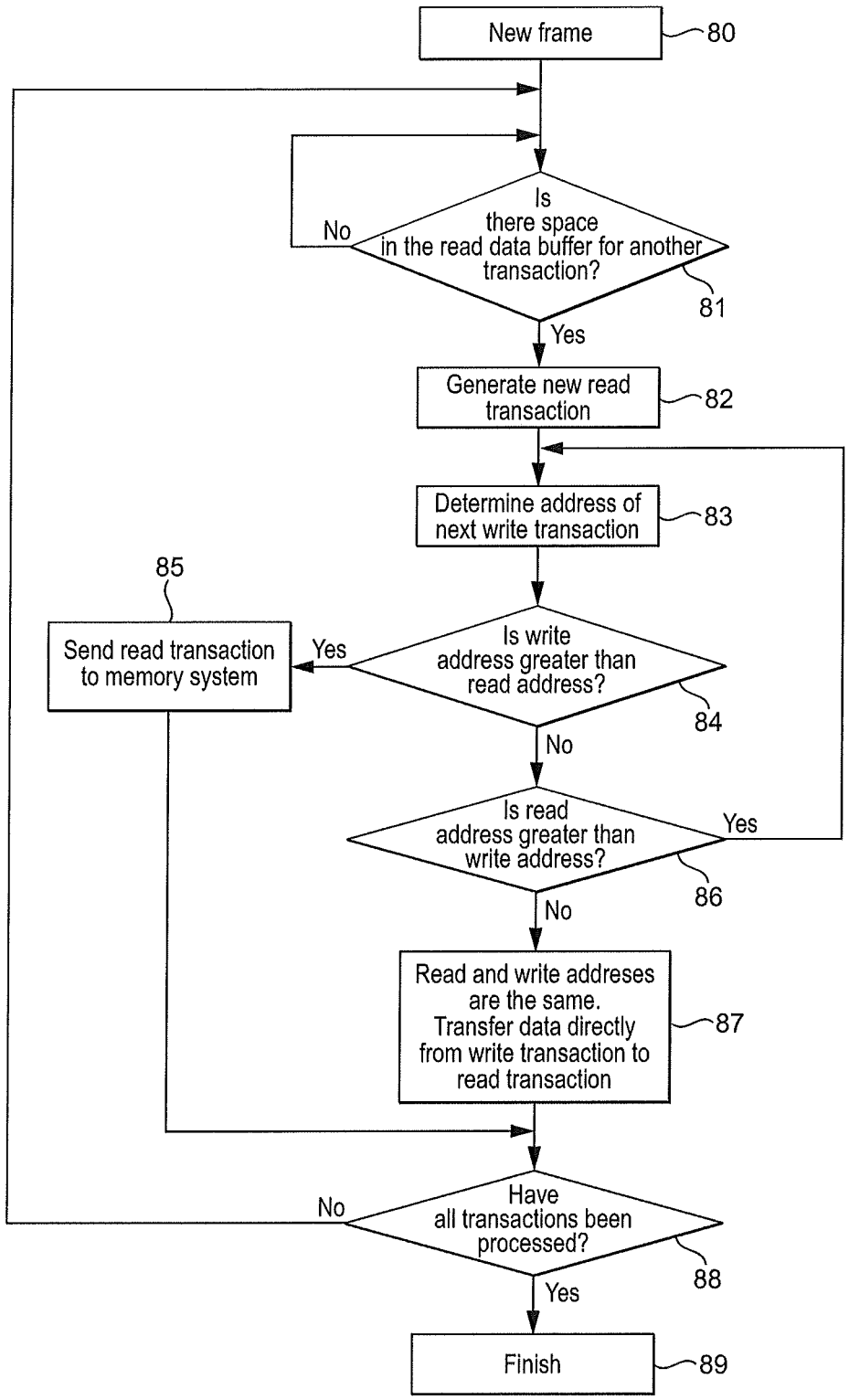
FIG. 8 shows schematically a read transaction process in accordance with an embodiment of the technology described herein.

FIG. 8 shows schematically a read transaction process in accordance with an embodiment.

The process is repeated for each new frame to be displayed, and begins at step 80 for each new frame.

It is initially determined whether or not there is space in the read subsystem's read buffer (step 81). This step is repeated until it is determined that there is sufficient space, and then a read transaction is generated (step 82).

The memory address of the next write transaction generated by the other display core's write controller 27, 47 is then determined (step 83), and it is determined whether that write transaction address indicates that a write transaction corresponding to the read transaction has already been processed (e.g. by determining whether the write transaction has a memory address greater than the current read transaction or otherwise) (step 84). Where it is determined that a write transaction corresponding to the read transaction has already been processed (e.g. where the memory address is greater), then the read transaction is sent to the memory system (step 85) for processing, and the process continues at step 88.

Where, on the other hand, the write transaction address indicates that a write transaction corresponding to the read transaction has not already been processed (e.g. where the memory address is not greater), it is then determined whether the read transaction can be processed by directly transferring data via the internal data path (e.g. by determining whether the current read transaction has a memory address greater than the write transaction or otherwise) (step 86). Where it is determined that the read transaction cannot be processed by directly transferring data via the internal data path 30, 31 (e.g. where the current read transaction has a memory address greater than the write transaction), the process continues at step 83, i.e. by determining the memory address of the next write transaction, etc.

Where it is determined in step 86 that the read transaction can be processed by directly transferring data via the internal data path 30, 31 (e.g. where the current read transaction does not have a memory address greater than the write transaction, so that that the memory addresses are the same), then the data in respect of the write transaction is transferred directly to the other display core's read subsystem 41, 21 via the internal data path 30, 31 (step 87).

It is then determined at step 88 whether all the read transactions for the frame in question have been processed. If not, then the process loops back to step 81 for the next read transaction. If, on the other hand, all the read transactions have been processed for the current frame, then the process is finished at step 89. The process may then be repeated for the next frame, and so on.

In these arrangements, corresponding transactions may be determined to correspond if they have the same memory address, and the determination as to whether data has been written to memory may involve determining whether a write transaction has a memory address greater than the current read transaction addresses (e.g. in a "linear" arrangement). However, in other arrangements, e.g. where the output surface (image) is horizontally (mirrored) and/or vertically flipped (upside down) when read, etc., corresponding transactions may have different addresses and/or the relationship between memory addresses may be different or more complex. In these cases there will still be some relationship that relates the addresses (e.g. when they correspond) that can be determined/tested for, and that may be used in the determination.

Figure 9:
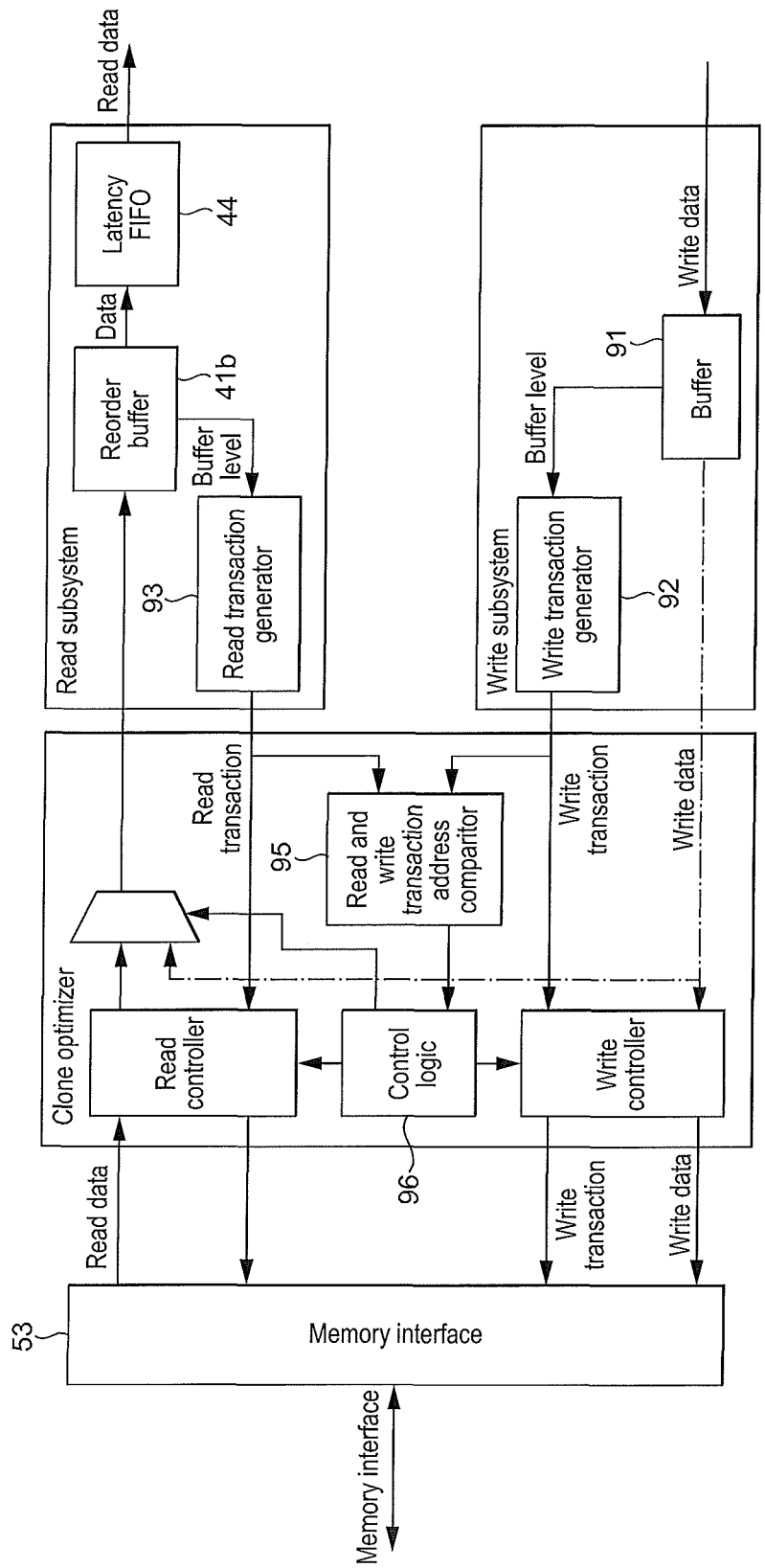
FIG. 9 shows schematically a portion of a display controller in accordance with an embodiment of the technology described herein.

FIG. 9 shows schematically a portion of a display controller in accordance with an embodiment of the technology described herein. FIG. 9 shows in detail one display core's read subsystem 41, the other display core's write subsystem 27, together with the clone mode optimisation stage 29 of the display controller 10.

As shown in FIG. 9, the display controller 10 is provided with a write buffer 91 for buffering data to be passed to the other display core, and a write transaction generator 92 for generating write transactions in respect of the buffered data. Correspondingly, the read subsystem 41 is provided with a read transaction generator 93 that generates read transactions in respect of data to be read by the read subsystem 41.

The clone mode optimisation stage 29 is provided with a transaction address comparator 94 for comparing memory addresses of read and write transactions, e.g. as described above. The clone mode optimisation stage 29 is also provided with control logic 96 for controlling read and write operations in the manner of the present embodiment.

In the present embodiment, the first 3 and second 5 displays may be configured to have the same or similar aspect ratios. This reduces the differences between the frames for display on the first 3 and second displays 5, and therefore the amount of additional processing required in order to generate the frame for display on the second display 5 from the frame generated by the primary processing core 20 (for display on the first display). This accordingly reduces the likelihood of delays in the frame generated by the primary display core 20 being available for transfer to the secondary display core 40. This in turn reduces the memory bandwidth and power requirements of the overall data processing system.

Similarly, the first 3 and second displays 5 may be configured to have the same or similar refresh rates. This again reduces the likelihood of any delay in the frame generated by the primary display core 20 being available for transfer to the secondary display core 40. This in turn reduces the memory bandwidth and power requirements of the overall data processing system.

Where the primary 3 and secondary 5 displays are operated with different resolutions, then the display core that is used to generate the output frame (and that passes the output frame to the other display core) may be the display core associated with the display that operates with the higher resolution. This means that when operating in the clone mode, where one of the display cores is used to generate a frame for display on both displays 3, 5, then the so-generated frame will have sufficient resolution for the high resolution display.

However, it would also be possible for the display core that is used to generate the output frame to be the display core associated with the display that operates at a lower resolution. In this case, the lower resolution output surface may be up-scaled by the display core that operates at a higher resolution, e.g. for display.

The second display 5 may be configured to display data slightly behind (in time) the first display 3. For example, the second display 5 may be operated one or more lines behind the first display 3, or one or more frames behind the first display 2. This reduces the likelihood that the output frame data generated by the primary display core 20 will not be available for transfer to the secondary display core 40 in time. This in turn reduces the memory bandwidth and power requirements of the overall data processing system.

Although the above embodiment has been described primarily in terms of the primary display core 20 generating a (composited output) frame and passing that frame to the secondary display core 40, e.g. at least partially via the internal data path 30, it would also, of course, be possible for the secondary display core 40 to generate a (composited output) frame and pass that frame to the primary display core 20, e.g. at least partially via the second internal data path 31. In this case, the display controller 10 may be operated in a corresponding manner, mutatis mutandi, to the embodiment described above.

Although the above embodiment has been described primarily in terms of a clone mode in which a display core generates a (e.g. composited output) frame and passes that frame to the secondary display core, in an embodiment via an internal data path, it would also be possible to both pass the generated (composited output) frame to the other display core (at least in part via an internal data path) and write the generated (composited output) frame to memory, e.g. for later use or for use by one or more other display cores.

When writing data to the memory 1, it would be possible, if desired, to use the Applicant's "transaction elimination" techniques, e.g. as described in the Applicants' earlier application GB-A-2474114, so as to reduce memory bandwidth.

It can be seen from the above that embodiments of the technology described herein enable a reduction in power consumption within a data processing system operating to provide output surfaces to plural displays. This is achieved in embodiments, by providing a dual core display controller with an internal data path for passing data of an output surface from one display core to the other display core.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A display controller for a data processing system, the display controller comprising:
a first display processing core comprising a first input stage circuit operable to read at least one input surface, a first processing stage circuit operable to process one or more input surfaces to generate one or more output surfaces, a first output stage circuit operable to provide any output surface of the one or more output surfaces for display to a first display, and a first write-out stage circuit operable to write data of any output surface of the one or more output surfaces to external memory;
a second, different display processing core comprising a second input stage circuit operable to read at least one input surface, a second processing stage circuit operable to process one or more input surfaces to generate a second output surface, and a second output stage circuit operable to provide the second output surface for display to a second different display; and
an internal data path for passing data of any output surface of the one or more output surfaces from the first display processing core to the second display processing core;
wherein the first display processing core and the second display processing core are part of a same monolithic integrated circuit, wherein the internal data path is internal to the monolithic integrated circuit; and
wherein the display controller is operable:
to determine for data of a first output surface of the one or more output surfaces generated by the first processing stage circuit that is to be provided from the first display processing core to the second display processing core, whether to provide that data from the first display processing core to the second display processing core either via the internal data path or by writing that data to the external memory; and
when it is determined to provide the data of the first output surface to the second display processing core via the internal data path, to provide the data of the first output surface to the second display processing core by passing the data of the first output surface from the first display processing core to the second display processing core via the internal data path; and
when it is determined to provide the data of the first output surface to the second display processing core by writing the data of the first output surface to the external memory, to provide the data of the first output surface to the second display processing core by the first write-out stage circuit writing the data of the first output surface to the external memory and the second input stage circuit reading the data of the first output surface from the external memory.

2. The display controller of claim 1, wherein:
the first display processing core comprises a buffer memory operable to buffer data of an input surface or surfaces read by the first input stage circuit; and/or
the second display processing core comprises a buffer memory operable to buffer data of an input surface or surfaces read by the second input stage circuit.

3. The display controller of claim 1, wherein:
the first display processing core comprises a re-order stage circuit operable to re-order data of an input surface or surfaces read by the first input stage circuit out of order; and/or
the second display processing core comprises a re-order stage circuit operable to re-order data of an input surface or surfaces read by the second input stage circuit out of order.

4. The display controller of claim 1, wherein:
the first processing stage circuit comprises a composition stage circuit operable to compose two or more input surfaces to provide a composited output surface; and
the second processing stage circuit comprises a composition stage circuit operable to compose two or more input surfaces to provide a composited output surface.

5. The display controller of claim 1, wherein:
the first display processing core comprises a buffer memory in the first display processing core operable to buffer data of an output surface or surfaces generated by the first processing stage circuit that is to be passed to the second display processing core; and the display controller is configured to store data of the output surface or surfaces generated by the first processing stage circuit in the buffer memory and to then pass the data of the output surface or surfaces generated by the first processing stage circuit from the buffer memory to the second display processing core via the internal data path.

6. The display controller of claim 1, wherein the internal data path connects the first write-out stage circuit to the second input stage circuit, and wherein the display controller is configured to pass data of any output surface of the one or more output surfaces generated by the first processing stage circuit from the first write-out stage circuit to the second input stage circuit via the internal data path.

7. The display controller of claim 1, wherein the display controller is operable to make the determination of whether to provide the data of the first output surface from the first display processing core to the second display processing core either via the internal data path or by writing the data of the first output surface to the external memory by considering one or more write transactions, one or more read transactions, and/or a state of one or more buffers.

8. The display controller of claim 1, wherein the first display processing core is configured to operate with the same resolution as or with a higher resolution than the second display processing core.

9. The display controller of claim 1, wherein the first and second display processing cores are configured to operate with the same or similar aspect ratios and/or are configured to operate with the same or similar refresh rates.

10. The display controller of claim 1, wherein the second display processing core is configured to provide data of the second output surface to the second display after the first display processing core provides output surface data to the first display.

11. The display controller of claim 1, wherein the output surface provided for display to the first display and the second output surface are the same.

12. A method of operating a display controller in a data processing system, the display controller comprising a first display processing core, a second, different display processing core and an internal data path for passing data of an output surface from the first display processing core to the second display processing core, the method comprising:

the first display processing core reading at least one input surface, processing one or more input surfaces to generate one or more output surfaces, and providing any output surface of the one or more output surfaces for display to a first display;

the display controller determining, for a first output surface of the one or more output surfaces generated by the first display processing core, whether to provide data of the first output surface to the second display processing core either via the internal data path or by writing that data to an external memory;

the display controller providing the data of the first output surface generated by the first display processing core to the second display processing core either by passing the data of the first output surface from the first display processing core to the second display processing core via the internal data path or by the first display processing core writing the data of the first output surface to the external memory and the second display processing core reading the data of the first output surface from the external memory; and the second display processing core receiving the first output surface generated by the first display processing core, processing one or more surfaces to generate a second output surface, and providing the second output surface for display to a second different display;

wherein the first display processing core and the second display processing core are part of the same monolithic integrated circuit, and wherein the internal data path is internal to the monolithic integrated circuit.

13. The method of claim 12, further comprising:

the first display processing core buffering data of the at least one input surface read by the first display processing core; and/or the second display processing core buffering data of the received first output surface generated by the first processing core.

14. The method of claim 12, further comprising:

the first display processing core re-ordering data of the at least one input surface read by the first display processing core; and/or the second display processing core re-ordering data of the received first output surface generated by the first processing core.

15. The method of claim 12, further comprising:

the first display processing core reading at least two input surfaces, compositing two or more of the at least two input surfaces to generate a first composited output surface, and providing the first composited output surface for display to the first display;

the first display processing core writing data of the first composited output surface to the external memory and/or passing data of the first composited output surface to the second display processing core via the internal data path; and the second display processing core reading at least one input surface, compositing the at least one input surface and the first composited output surface to generate a second composited output surface, and providing the second composited output surface for display to the second display.

16. The method of claim 12, further comprising:

the first display processing core buffering data of the first output surface generated by the first display processing core before writing the data to the external memory or before passing the data to the second display processing core via the internal data path.

17. The method of claim 12, wherein the determination is made by considering one or more write transactions, one or more read transactions, and/or a state of one or more buffers.

18. The method of claim 12, further comprising operating the first display processing core with the same resolution as or with a higher resolution than the second display processing core.

19. The method of claim 12, further comprising operating the first and second display processing cores with the same or similar aspect ratios.

20. The method of claim 12, further comprising operating the first and second display processing cores with the same or similar refresh rates.

21. The method of claim 12, further comprising the second display processing core providing data of the second output surface to the second display after the first display processing core has provided output surface data to the first display.

22. A non-transitory computer readable storage medium storing computer software code which when executing on a processor performs a method of operating a display controller in a data processing system, the display controller comprising a first display processing core, a second, different display processing core and an internal data path for passing data of an output surface from the first display processing core to the second display processing core, the method comprising:

the first display processing core reading at least one input surface, processing one or more input surfaces to generate one or more output surfaces, and providing any output surface of the one or more output surfaces for display to a first display;

the display controller determining, for a first output surface of the one or more output surfaces generated by the first display processing core, whether to provide data of the first output surface to the second display processing core either via the internal data path or by writing that data to an external memory;

the display controller providing the data of the first output surface generated by the first display processing core to the second display processing core either by passing the data of the first output surface from the first display processing core to the second display processing core via the internal data path or by the first display processing core writing the data of the first output surface to the external memory and the second display processing core reading the data of the first output surface from the external memory; and the second display processing core receiving the first output surface generated by the first processing core, processing one or more surfaces to generate a second output surface, and providing the second output surface for display to a second different display;

wherein the first display processing core and the second display processing core are part of the same monolithic integrated circuit, and wherein the internal data path is internal to the monolithic integrated circuit.

* * * * *